US009655036B2

(12) United States Patent
Yang et al.

(10) Patent No.: US 9,655,036 B2
(45) Date of Patent: May 16, 2017

(54) SYSTEM AND METHOD FOR UTILIZING STORED HIGHER LAYER INFORMATION

(71) Applicant: Futurewei Technologies, Inc., Plano, TX (US)

(72) Inventors: Yunsong Yang, San Diego, CA (US); Young Hoon Kwon, San Diego, CA (US); Zhigang Rong, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/702,309

(22) Filed: May 1, 2015

(65) Prior Publication Data
US 2015/0327160 A1 Nov. 12, 2015

Related U.S. Application Data

(60) Provisional application No. 61/991,992, filed on May 12, 2014.

(51) Int. Cl.
*H04W 48/18* (2009.01)
*H04W 36/00* (2009.01)
(Continued)

(52) U.S. Cl.
CPC ......... *H04W 48/18* (2013.01); *H04W 36/005* (2013.01); *H04W 48/14* (2013.01); *H04W 48/16* (2013.01); *H04W 84/12* (2013.01)

(58) Field of Classification Search
CPC ..... H04W 48/14; H04W 48/16; H04W 48/18; H04W 84/12; H04W 36/005;
(Continued)

(56) References Cited

U.S. PATENT DOCUMENTS 7,376,091 B1 * 5/2008 Eccles ................... H04W 92/02
370/265
8,014,804 B2 * 9/2011 Banerjea ............... H04W 48/20
370/328
(Continued)

FOREIGN PATENT DOCUMENTS

CN 1949769 A 4/2007
CN 1980170 A 6/2007
(Continued)

OTHER PUBLICATIONS

"IEEE Standard for Information technology—Telecommunications and information exchange between systems Local and metropolitan area networks—Specific requirements; Part 11: Wirless LAN Medium Access Control (MAC) and Physical Layer (PHY) Specificiations," IEEE Std 802.11tm-2012, IEEE Computer Society, LAN/MAN Standards Committee, Mar. 29, 2012, 2,793 pages.
(Continued)

*Primary Examiner* — Afsar M Qureshi
(74) *Attorney, Agent, or Firm* — Futurewei Technologies, Inc.

(57) ABSTRACT

A method for operating a station during a discovery process includes transmitting a first Layer 2 frame to an access point (AP), the first Layer 2 frame including a first version number associated with first higher layer information and an identifier of a protocol associated with both the first higher layer information and the first version number, receiving a second Layer 2 frame from the AP including an indication that a second version number associated with a second higher layer information is the same as the first version number, and deciding whether to perform a network selection process in accordance with the first higher layer information.

41 Claims, 20 Drawing Sheets

(51) Int. Cl.
*H04W 84/12* (2009.01)
*H04W 48/14* (2009.01)
*H04W 48/16* (2009.01)

(58) Field of Classification Search
CPC ............ H04L 41/0843; H04L 41/0856; H04L 41/0886; H04L 41/0893; H04L 45/02; H04L 61/1523
USPC .................................................. 370/254–329
See application file for complete search history.

(56) References Cited

U.S. PATENT DOCUMENTS

| | | | | |
|---|---|---|---|---|
| 9,226,163 B2* | 12/2015 | Kim | ............... | H04W 16/14 |
| 2006/0183479 A1* | 8/2006 | Liu | ............... | H04W 36/005 |
| | | | | 455/436 |
| 2007/0127414 A1 | 6/2007 | Kamashi et al. | | |
| 2008/0008111 A1 | 1/2008 | Prakash et al. | | |
| 2009/0010399 A1* | 1/2009 | Kim | ............... | H04L 12/2856 |
| | | | | 379/45 |
| 2013/0121325 A1 | 5/2013 | McCann et al. | | |
| 2014/0133391 A1* | 5/2014 | Djukic | ............... | H04W 76/00 |
| | | | | 370/328 |
| 2014/0233452 A1* | 8/2014 | Kim | ............... | H04L 12/1881 |
| | | | | 370/312 |
| 2015/0003327 A1* | 1/2015 | Seok | ............... | H04W 4/06 |
| | | | | 370/328 |
| 2015/0078358 A1 | 3/2015 | Park et al. | | |
| 2015/0208324 A1* | 7/2015 | McCann | ............... | H04W 48/10 |
| | | | | 370/338 |
| 2015/0358972 A1* | 12/2015 | Lee | ............... | H04W 48/18 |
| | | | | 370/329 |

FOREIGN PATENT DOCUMENTS

| | | |
|---|---|---|
| WO | 2013/122396 A1 | 8/2013 |
| WO | 2013/183931 A1 | 12/2013 |

OTHER PUBLICATIONS

"Draft Standard for Information Technology—Telecommunications and information exchange between systems—Local and metropolitan area networks—Specific reqirements; Part 11: Wireless LAN Medium Access Control (MAC) and Physical Layer (PHY) Specifications; Amendment 7: Fast Initial Link Setup," IEEE P802.11aitm/D2.0, 802.11 Working Group of the 802 Committee, Apr. 2014, 138 pages.

Partial Supplementary European Search Report for EP 15792441.6, Mar. 22, 2017, 10 pages.

IEEE P802.11u/D9.0, Draft Standard for Information Technology—Telecommunications and information exchange between systems—Local and metropolitan area networks—Specific requirements, Part 11: Wireless LAN Medium Access Control (MAC) and Physical Layer (PHY) specifications, Amendment 7: Interworking with External Networks, (Apr. 2010) 200 pages.

Phillip Barber et al., IEEE 801.11-11/1498-01-00ai, "GAS Version Control in 11ai," Oct. 24, 2011, 16 pages.

Giwon Park et al., IEEE 802.11-12/0255r1, "GAS procedure in TGai," Mar. 3, 2012, 8 pages.

* cited by examiner

| OCTETS: | 2 | 2 | VARIABLE |
|---|---|---|---|
| | INFO ID | LENGTH | INFORMATION |

*Fig. 4*

| ANQP-ELEMENT NAME | INFO ID | ANQP-ELEMENT (SUBCLAUSE) |
|---|---|---|
| RESERVED | 0-255 | N/A |
| QUERY LIST | 256 | 8.4.4.2 |
| CAPABILITY LIST | 257 | 8.4.4.3 |
| VENUE NAME | 258 | 8.4.4.4 |
| EMERGENCY CALL NUMBER | 259 | 8.4.4.5 |
| NETWORK AUTHENTICATION TYPE | 260 | 8.4.4.6 |
| ROAMING CONSORTIUM | 261 | 8.4.4.7 |
| IP ADDRESS TYPE AVAILABILITY | 262 | 8.4.4.9 |
| NAI REALM | 263 | 8.4.4.10 |
| 3GPP CELLULAR NETWORK | 264 | 8.4.4.11 |
| AP GEOSPATIAL LOCATION | 265 | 8.4.4.12 |
| AP CIVIC LOCATION | 266 | 8.4.4.13 |
| AP LOCATION PUBLIC IDENTIFIER URI | 267 | 8.4.4.14 |
| DOMAIN NAME | 268 | 8.4.4.15 |
| EMERGENCY ALERT IDENTIFIER URI | 269 | 8.4.4.16 |
| TDLS CAPABILITY | 270 | 8.4.4.18 |
| EMERGENCY NAI | 271 | 8.4.4.17 |
| NEIGHBOR REPORT | 272 | 8.4.4.19 |
| RESERVED | 273-56796 | N/A |
| VENDOR SPECIFIC | 56797 | 8.4.4.8 |
| RESERVED | 56798-65535 | N/A |

*Fig. 5*

SYSTEM AND METHOD FOR UTILIZING STORED HIGHER LAYER INFORMATION

This application claims the benefit of U.S. Provisional Application No. 61/991,992, filed on May 12, 2014, entitled "System and Method for Utilizing Stored Higher Layer Information," which application is hereby incorporated herein by reference.

TECHNICAL FIELD

The present disclosure relates generally to digital communications, and more particularly to a system and method for using stored higher layer information.

BACKGROUND

The IEEE 802.11 family of technical standards and attendant technologies, also commonly referred to as Wi-Fi, is evolving towards a service-centric model of connectivity where devices connect for a specific purpose. The purposeful connections are triggered by applications looking for networks and/or peer devices that support specific services. Examples of these services include file sharing, printing, media streaming, sensor information, and the like.

SUMMARY OF THE DISCLOSURE

Example embodiments of the present disclosure provide a system and method for utilizing stored higher layer information.

In accordance with an example embodiment of the present disclosure, a method for operating a station during a discovery process is provided. The method includes transmitting, by the station, a first Layer 2 frame to an access point (AP), the first Layer 2 frame including a first version number associated with first higher layer information and an identifier of a protocol associated with both the first higher layer information and the first version number, receiving, by the station, a second Layer 2 frame from the AP including an indication that a second version number associated with a second higher layer information is the same as the first version number, and deciding, by the station, whether to perform a network selection process in accordance with the first higher layer information.

In accordance with another example embodiment of the present disclosure, a method for operating an access point is provided. The method includes receiving, by the access point, a first Layer 2 frame from a station, the first Layer 2 frame including a first version number associated with first higher layer information and an identifier of a protocol associated with both the first higher layer information and the first version number, obtaining, by the access point, a second version number associated with second higher layer information from a server, determining, by the access point, if the first version number and the second version number match, and transmitting, by the access point, a second Layer 2 frame to the station when the first version number and the second version number match, the second Layer 2 frame including an indication that the first version number and the second version number match.

In accordance with another example embodiment of the present disclosure, a station adapted to perform a discovery process is provided. The station includes a processor, and a computer readable storage medium storing programming for execution by the processor. The programming including instructions to transmit a first Layer 2 frame to an access point (AP), the first Layer 2 frame including a first version number associated with first higher layer information and an identifier of a protocol associated with both the first higher layer information and the first version number, receive a second Layer 2 frame from the AP including an indication that a second version number associated with a second higher layer information is the same as the first version number, and decide whether to perform a network selection process in accordance with the first higher layer information.

In accordance with another example embodiment of the present disclosure, an access point adapted to participate in a discovery process is provided. The access point includes a processor, and a computer readable storage medium storing programming for execution by the processor. The programming including instructions to receive a first Layer 2 frame from a station, the first Layer 2 frame including a first version number associated with first higher layer information and an identifier of a protocol associated with both the first higher layer information and the first version number, obtain a second version number associated with second higher layer information from a server, determine if the first version number and the second version number match, and transmit a second Layer 2 frame to the station when the first version number and the second version number match, the second Layer 2 frame including an indication that the first version number and the second version number match.

In accordance with another example embodiment of the present disclosure, a method for operating a communications device adapted to send a frame is provided. The method includes generating, by the communications device, a Layer 2 frame comprising at least one Common Advertisement Group (CAG) tuple field, wherein the at least one CAG tuple field comprises a CAG version number field containing a CAG version number, a scope field containing a scope value, and an identifier of advertisement protocol field, and sending, by the communications device, the Layer 2 frame.

In accordance with another example embodiment of the present disclosure, a station is provided. The station includes a processor, and a computer readable storage medium storing programming for execution by the processor. The programming including instructions to generate a Layer 2 frame comprising at least one Common Advertisement Group (CAG) tuple field, wherein the at least one CAG tuple field comprises a CAG version number field containing a CAG version number, a scope field containing a scope value, and an identifier of advertisement protocol field, and send the Layer 2 frame.

Practice of the foregoing embodiments allow an AP to short-circuit a query request that is initiated by an STA and designated to a server supporting a higher layer service when the STA stored higher layer information version number is the same as the current higher layer information version number of the server, thus providing a quick response to the STA and allowing the STA to make a quick decision such as a network selection decision.

Moreover the tradition that APs are not required to understand content of the higher layer query request or query response is maintained, by using signaling means outside a container field that carries the higher layer query request or query response, e.g., using Advertisement Protocol element or a CAG Number element to carry the higher layer information version number and using a Status Code value to indicate that the stored higher layer information version number is the same as (or different from) the current higher layer information version number of a server supporting the higher layer service.

BRIEF DESCRIPTION OF THE DRAWINGS

For a more complete understanding of the present disclosure, and the advantages thereof, reference is now made to the following descriptions taken in conjunction with the accompanying drawing, in which:

FIG. 4 illustrates a common format of ANQP-elements;

FIG. 5 illustrates a list of example ANQP-elements;

DETAILED DESCRIPTION OF ILLUSTRATIVE EMBODIMENTS

The operating of the current example embodiments and the structure thereof are discussed in detail below. It should be appreciated, however, that the present disclosure provides many applicable example embodiments that can be embodied in a wide variety of specific contexts. The example embodiments discussed are merely illustrative of specific structures of the disclosure and ways to operate the disclosure, and do not limit the scope of the disclosure.

One embodiment of the disclosure relates to using stored higher layer information. For example, a station transmits a first Layer 2 frame to an access point (AP), the first Layer 2 frame including a first version number associated with first higher layer information and an identifier of a protocol associated with both the first higher layer information and the first version number, receives a second Layer 2 frame from the AP including an indication that a second version number associated with a second higher layer information is the same as the first version number, and decides whether to perform a network selection process in accordance with the first higher layer information.

The present disclosure will be described with respect to example embodiments in a specific context, namely communications systems that support service centric connections and pre-association to discover services prior to the establishment of a connection. The disclosure may be applied to standards compliant communications systems, such as those that are compliant with IEEE 802.11ai, IEEE 802.11af, IEEE 802.11aq, the Wi-Fi Alliance (WFA) Optimized Connectivity Experience (OCE) specification, the WFA TV White Space (TVWS) specification, the WFA Application Service Platform-Infrastructure (ASP-I) specification, the Third Generation Partnership Project (3GPP) Device-to-Device (D2D) specification, and the like, technical standards, and non-standards compliant communications systems, that support service centric connections and pre-association discovery.

Figure 1:
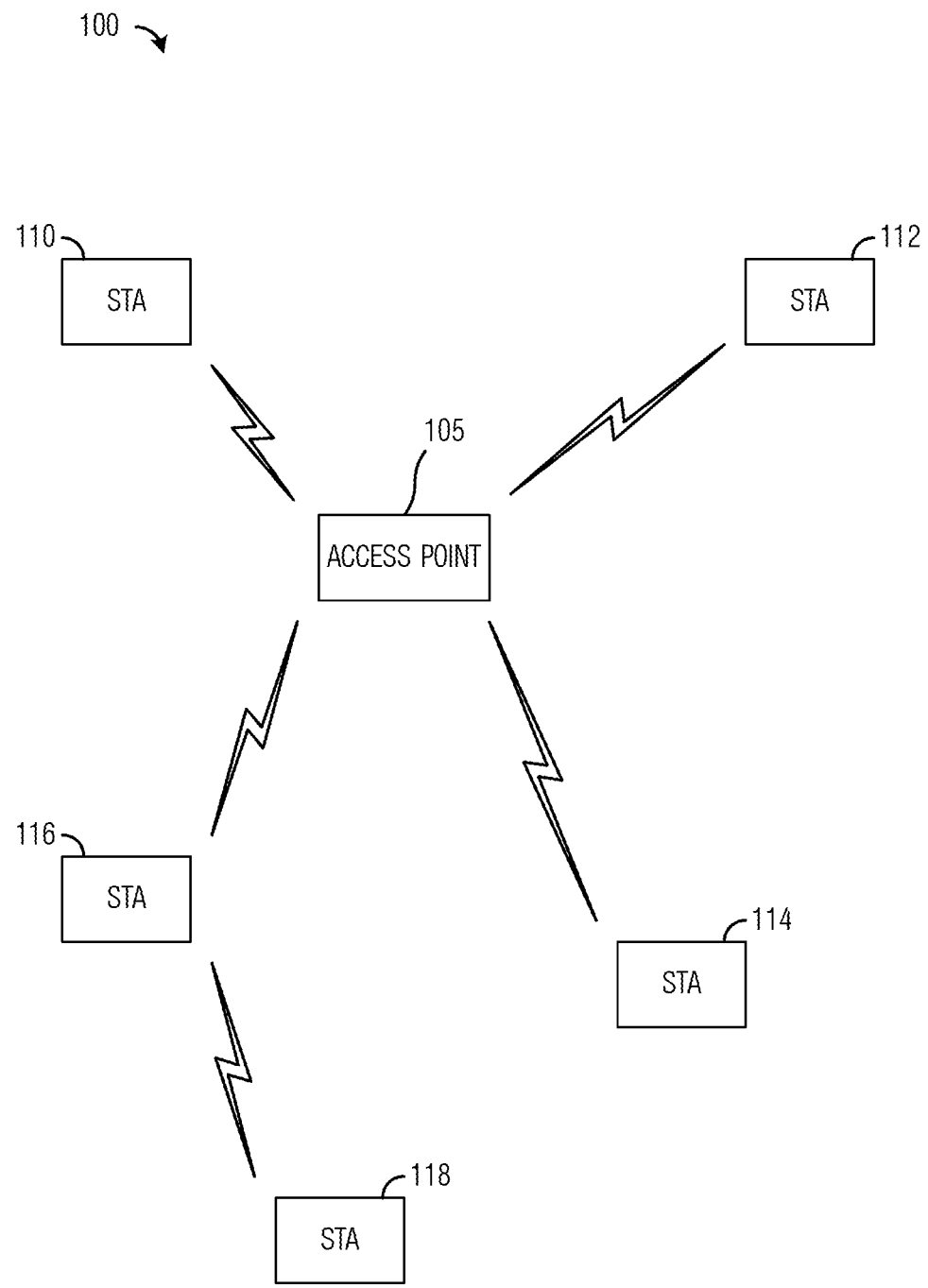
FIG. 1 illustrates a first example communications system according to example embodiments described herein.

FIG. 1 illustrates a first example communications system 100. Communications system 100 includes an access point (AP) 105 that is serving a plurality of devices, such as device 110, device 112, device 114, device 116, and device 118. An AP may also be commonly referred to as a base station, a communications controller, a controller, a NodeB, an evolved NodeB (eNB), and the like. A device may also be commonly referred to as a station (STA), a user equipment (UE), a mobile station, a mobile, a user, a subscriber, a terminal, and the like. In a first communications mode, the devices may communicate through AP 105 by transmitting a frame to AP 105, which forwards the frame to its intended recipient. In a second communications mode, a first device may transmit a frame directly to a second device without having to go through AP 105.

While it is understood that communications systems may employ multiple APs capable of communicating with a number of stations, only a single AP, and a number of stations are illustrated in FIG. 1 for simplicity.

A STA usually performs network discovery and selection (NDS) procedure before accessing an AP and the services provided by it. The NDS procedure is conducted prior to the authentication and association procedure and usually involves the discovery of an AP.

The IEEE technical standard 802.11u defined an Access Network Query Protocol (ANQP) and a Layer 2 transport means known as the generic advertisement service (GAS) frames to allow STAs to discover the features, services, parameters of an access network and/or subscription service provider network (SSPN) connected with the AP, prior to associating with the AP, in order for the STAs to make an informed decision regarding network selection. The GAS transport mechanism has been extended to support additional advertisement protocols such as medium-independent handover (MIH) as defined in IEEE Standard 802.21 and registered location query protocol (RLQP) as defined in IEEE 802.11af Amendment. Currently, the IEEE 802.11aq project is also considering using GAS to support a pre-association discovery protocol for service information discovery prior to association.

Figure 2:
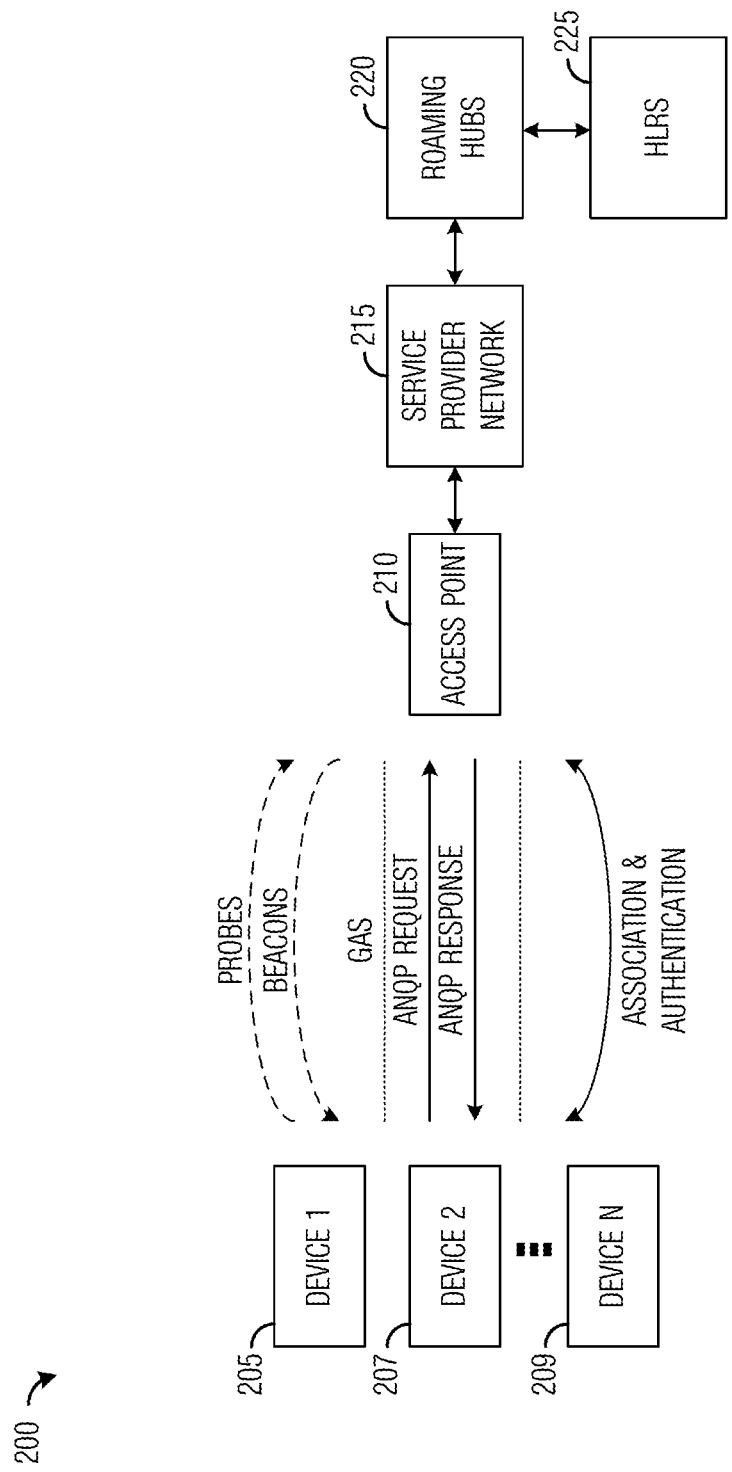
FIG. 2 illustrates a second example communications system highlighting GAS and ANQP operation according to example embodiments described herein.

FIG. 2 illustrates a second example communications system 200 highlighting GAS and ANQP operation. First, a user of a device initiates the intention to connect to Wi-Fi, and the user's device scans for available access points, which are also referred to as the Wi-Fi hotspots. In IEEE 802.11u, GAS frames are used to provide for Layer 2 transport of query request data and query response data of an advertisement protocol between the client on the user's device and an AP, which is connected to a server in the network, prior to authentication and association with the AP. The query request data and query response data are further transported between the AP and the server utilizing, typically, an IP transport and an upper layer protocol such as Diameter or Remote Authentication Dial In User Service (RADIUS). In IEEE 802.11u, ANQP is a particular advertisement protocol used to discover different features and available services of the access network. After receiving the ANQP query response data, the user's device selects a particular AP, and then proceeds with the authentication and association procedures which results in the establishment of a connection with the AP.

Communications system 200 may be an example of a Wi-Fi compliant communications system. Communications system 200 may utilize communications services and protocols, such as GAS and ANQP, to support operations including scanning and network selection. In general, GAS frames may be used to provide Layer 2 transport of request data and response data of an advertisement protocol, such as ANQP, between a terminal and a server in a communications system, such as communications system 200, prior to or post authentication and association (of the terminal, for example). Typically, ANQP may be used to discover different features and/or services of the communications system. A device compares the information regarding different networks or access points to select the best suitable to associate with, for example. The device may proceed with an authentication process.

Usually, a station may be used to refer to any of the devices (such as devices 205, 207, and 209) shown in FIG. 2, which may include a cell phone, a laptop computer, a tablet, a smart sensor, a handheld or consumer electronic device, as well as other devices that have an interface (such as a Wi-Fi interface) that can interact with communications system 200. Some or all of the stations may also be able to interact with other types of communications systems, such as cellular networks, Bluetooth, proprietary networks, and the like.

An AP 210 and one or more stations may form a basic service set (BSS), which is the basic building block of a Wi-Fi communications system. A BSS may be identified by a service set identifier (SSID), which is a configured identifier and may be broadcasted by an AP of the BSS, such as AP 210. AP 210 may communicate with an AP controller or/and an ANQP server, which can be co-located or not with AP 210. AP 210 may be connected to a service provider network 215, which is connected to one or more roaming hubs 220. Roaming hubs 220 may be connected to home location register (HLRs) 225. Roaming hubs 220 and HLRs 225 provide support for device mobility, i.e., roaming.

Figure 3A:
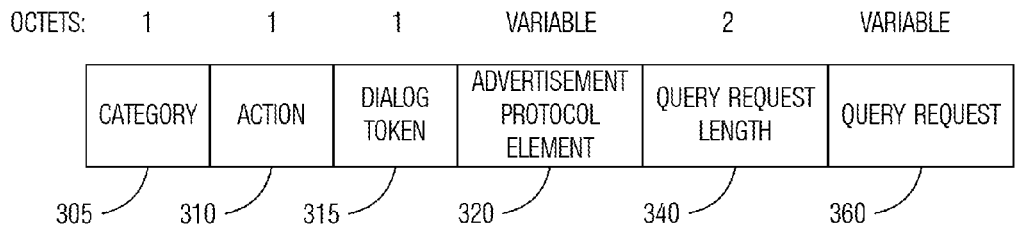
FIG. 3a illustrates an example frame body format of a GAS Initial Request frame.

GAS frames have been specified since 802.11u and are currently incorporated into IEEE Standard 802.11-2012. GAS frames include GAS Initial Request frame, GAS Comeback Request frame, GAS Initial Response frame, and GAS Comeback Response frame. A GAS Initial Request frame is sent by a requesting STA to initiate a query process. As illustrated in FIG. 3a, a GAS Initial Request frame body comprises Category field 305 and Action field 310, which together indicate that the frame is a GAS Initial Request frame, Dialog Token field 315 containing a sequence number used for matching a response with a request, Advertisement Protocol element 320, Query Request field 360, and Query Request Length field 340 indicating the length, in octets, of Query Request field 360.

Figure 3B:
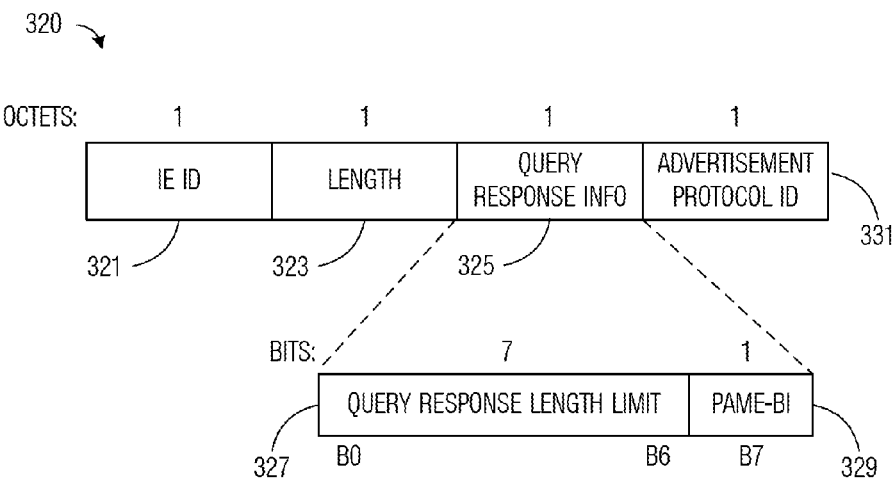
FIG. 3b illustrates an example format of Advertisement Protocol element.

Advertisement Protocol element 320 is used for indicating an advertisement protocol associated with a query request included in the GAS Initial Request frame. When included in a GAS Initial Response or GAS Comeback Response frame, the Advertisement Protocol element is also used for indicating the advertisement protocol associated with a query response included in the GAS Initial Response or GAS Comeback Response frame. As illustrated in FIG. 3b, Advertisement Protocol element 320 includes Query Response Info field 325 and Advertisement Protocol ID field 331. Advertisement Protocol ID field 331 contains an identifier specified for the corresponding advertisement protocol. Query Response Info field 325 is a 1-octet field consisting of 7-bit Query Response Length Limit subfield 327 and 1-bit PAME-BI subfield 329. IEEE Standard 802.11-2012 specifies that when an Advertisement Protocol element is included in a Beacon, Probe Response, GAS Initial Response, or GAS Comeback Response frame, the Query Response Length Limit subfield contains a value of maximum number of octets that a responder may transmit in a Query Response field contained within one or more GAS Comeback Response frames, and when the Advertisement Protocol element is included in a GAS Initial Request frame, such as Advertisement Protocol element 320, the entire 1-octet Query Response Info field 325 is set to a value of zero and a responder (such as an AP) ignores this field upon reception.

Query Request field 360 is a generic container that carries the query request of an advertisement protocol, which is normally located above Layer 2 in a protocol stack and uses the Layer 2 transport service provided by the GAS frames. Therefore, an AP receiving a GAS Initial Request frame is not required to interpret the content of Query Request field 360. The AP may just retrieve the content of Query Request field 360 based on the value in Query Request Length field 340 and forward it to the corresponding advertisement protocol server based on the value in Advertisement Protocol ID field 331 and using a protocol and a transport means that has been established between the AP and the server. In a typical deployment, the AP is connected with the server through a wired-line connection with an IP-based transport. Examples of upper layer protocols used between the AP and the server include Diameter and RADIUS.

For ANQP, a query request contained in Query Request field 360 normally comprises a Query List ANQP-element, which provides a list of identifiers of ANQP-elements for which the requesting STA wishes to receive. ANQP-elements are defined to have a common format consisting of a 2-octet Info ID field, a 2-octet Length field, and a variable-length element-specific Information field, as illustrated in FIG. 4. FIG. 5 lists some example ANQP-elements defined in 802.11-2012. Most of the ANQP-elements listed in FIG. 5 are used for forming ANQP query responses. Query List ANQP-element is one exception and it is used for forming ANQP query requests. Other advertisement protocols may define protocol-specific elements with a similar common format as illustrated in FIG. 4. For example, 802.11af Amendment has defined some RLQP-elements that are specific for RLQP.

Figure 6:
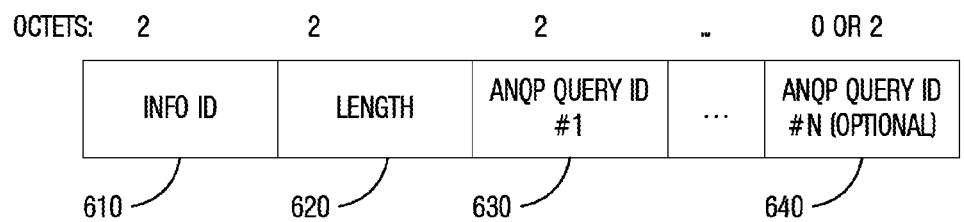
FIG. 6 illustrates an example format of Query List ANQP-element.

The format of the Query List ANQP-element is illustrated in FIG. 6. As shown in FIG. 6, the Query list ANQP-element comprises Info ID field 610 containing the value corresponding to the Query list ANQP-element as defined in FIG. 5, Length field 620 indicating the length, in octets, of the remaining fields within the Query List ANQP-element, and one or more ANQP Query ID fields, such as ANQP Query ID field 630 and ANQP Query ID field 640, each containing an Info ID of an ANQP-element that the STA is requesting. Including an Info ID in the Query List ANQP-element declares that the STA performing the ANQP query request wishes to receive the ANQP-element corresponding to the Info ID in the ANQP query response.

After forwarding the query request to the corresponding advertisement protocol server, the AP may receive a query response from the server. The AP may use a GAS Initial Response frame to carry the query response to the requesting STA, if the query response size is within the size limit of a single GAS Initial Response frame. Then, the query process may end. Otherwise, the AP fragments the over-sized query response into multiple GAS Comeback Response frames and sends a GAS Initial Response frame with a non-zero comeback delay value and without including any part of the query response to invite the requesting STA to send GAS Comeback Request frames to receive the multiple GAS Comeback Response frames in order to retrieve all fragments of the query response. The STA then sends a GAS Comeback Request frame, receives a GAS Comeback Response frame in response, and repeats these steps until the GAS Comeback Response frame carrying the last fragment of the query response is received. Then, the STA may reassemble the query response. After that, the query process may end. The AP is not required to interpret the content of the query response received from the advertisement protocol server. The AP just retrieves the content of the query response, fragments it if it is over-sized, and sends it to the requesting STA using a GAS Initial Response frame, or one or more GAS Comeback Response frames.

Figure 7:
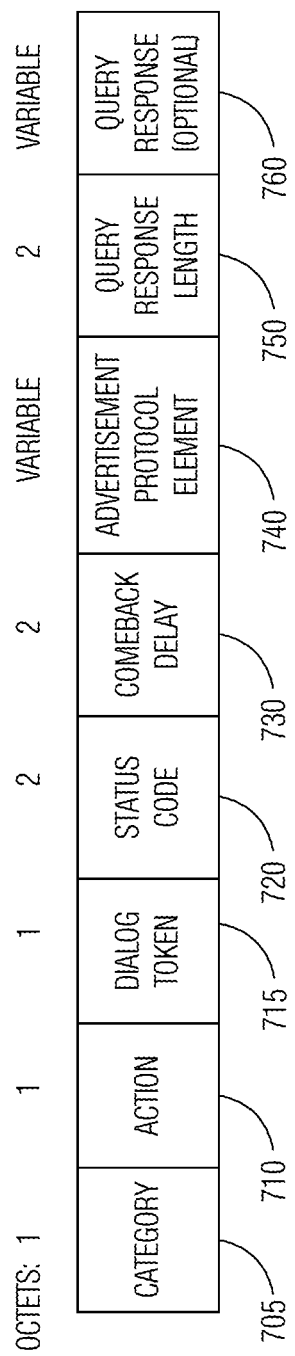
FIG. 7 illustrates an example frame body format of a GAS Initial Response frame.

FIG. 7 illustrates the frame body of a GAS Initial Response frame. As shown in FIG. 7, a GAS Initial Response frame body comprises Category field 705 and Action field 710, which together indicate that the frame is a GAS Initial Response frame, Dialog Token field 715 containing a same value obtained from the Dialog Token field of the corresponding GAS Initial Request frame, Status Code field 720 indicating a status of the corresponding query process, Comeback Delay field 730 containing a comeback delay value, Advertisement Protocol element 740 having a same structure as Advertisement Protocol element 320, and Query Response Length field 750. The GAS Initial Response frame body may optionally include Query Response field 760. A value of zero contained in Query Response Length field 750 indicates the absence of Query Response field 760. A non-zero value contained in Query Response Length field 750 indicates the presence and the length, in octets, of Query Response field 760.

Since the service features and parameters of an access network may remain unchanged for a long time and meanwhile an STA may visit a same AP and, through the AP, a same access network or subscription service provider network (SSPN) day after day, it may be wasteful for the STA to repeatedly send an ANQP query request to the same ANQP server. In the 802.11ai project, a notion of ANQP Configuration Sequence Number was developed, where an ANQP Configuration Sequence Number, which is also known as a Common ANQP Group version number (CAG version number) and is currently renamed by IEEE 802.11 Task Group Ai as a Common Advertisement Group version number (also abbreviated CAG version number), is associated with a group of access network service features and parameters that are expressed in the form of ANQP-elements. This group of ANQP-elements is referred as a Common ANQP Group (CAG) and is currently renamed by IEEE 802.11 Task Group Ai as a Common Advertisement Group (CAG). A vendor of the ANQP server and the access network may decide which ANQP-elements are within the CAG and may maintain a CAG version number. The CAG version number is incremented every time when the member ANQP-element(s) within the CAG change or any value of the attributes of the member ANQP-element(s) within the CAG changes. During a previous visit to an AP, an STA may have obtained a CAG (i.e., the group of ANQP-elements) associated with the AP, the corresponding CAG version number and scope value, BSSID, HESSID, and/or ESSID of the AP, from the AP and/or from the ANQP server behind the AP. This information may be referred to as higher layer information. The STA may store the higher layer information for later use.

A CAG Number element was defined in IEEE Draft 802.11ai Amendment D2.0 for an AP to indicate the current CAG version number to the STAs. The AP may obtain the current CAG version number from the corresponding ANQP server. The AP may include the CAG Number element in the Beacon frames or Probe Response frames that the AP sends out. The CAG Number element may be used by an STA to determine if the CAG information (the higher layer information), i.e., the group of ANQP-elements and the values in these ANQP-elements, that the STA stored for the AP during a previous visit is still currently valid or not by comparing the stored CAG version number with the CAG version number in the CAG Number element received. If the two CAG version numbers are equal, the STA may continue the NDS procedure using the stored CAG information and without initiating an ANQP query process, as the query response that it would otherwise get would be the same as what it has stored. In this way, the numbers of ANQP query requests and query responses, and of the associated GAS frames may be reduced.

Figure 8:
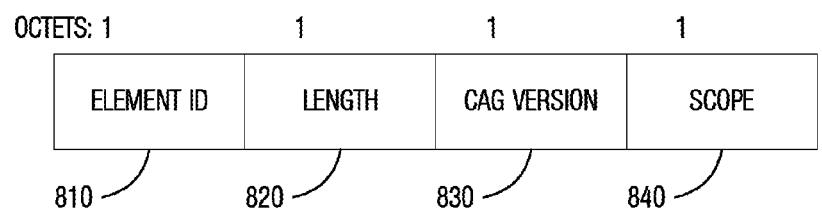
FIG. 8 illustrates an example format of CAG Number element.

FIG. 8 illustrates the format of a CAG Number element in IEEE Draft 802.11ai Amendment D2.0. As shown in FIG. 8, CAG Number element 800 comprises Element ID field 810 containing an element identifier value corresponding to the CAG Number element, Length field 820 indicating the length, in octets, of the remaining fields in the CAG Number element, CAG Version field 830 indicating the current CAG version number, and Scope field 840. The value in CAG Version field 830 may always be a positive number, thus a value of zero in this field will be neglected by a receiving STA. Scope field 840 contains a value indicating a valid scope of the CAG associated with the value contained in CAG Version field 830. A value of 0 in Scope field 840 indicates that the CAG is only valid within the current Basic Service Set (BSS), which is identified by the BSSID value, of the AP. A value of 1 in Scope field 840 indicates that the CAG is valid within the Homogeneous Extended Service Set (ESS), which is identified by the HESSID value, of the AP. And a value of 2 in Scope field 840 indicates that the CAG is valid within the Extended Service Set (ESS), which is the union of BSSs with the same SSID, of the AP. The values from 3 to 255 are currently reserved for Scope field 840.

As discussed before, including the CAG version (in the CAG Number element) in the Beacon frame that an AP periodically broadcasts may help to reduce the number of ANQP query requests and query responses. This approach is generally characterized as "push". However, the inclusion of the CAG Number element in the Beacon frames also represents additional signaling overhead that the AP needs to transmit periodically. At places where a large number of Wi-Fi STAs frequently visit, such as train stations and shopping malls, it may be worthwhile for the AP to "push" the current CAG version number to the STAs by broadcasting it in the Beacon frame, considering that the benefits of saving frequent ANQP query exchanges may out-weight the price of transmitting additional signaling overhead in the Beacon frames. However, considering that most APs, in the absence of a high density of Wi-Fi STAs, do not receive ANQP queries as frequently as it transmits Beacon frames in practice, these APs may choose not to include CAG Number IE in their Beacon frames. Therefore, it may be better to use a "pull" mechanism where an STA interested in knowing the current CAG version number sends a request for such information to be returned by a responder.

Figure 9:
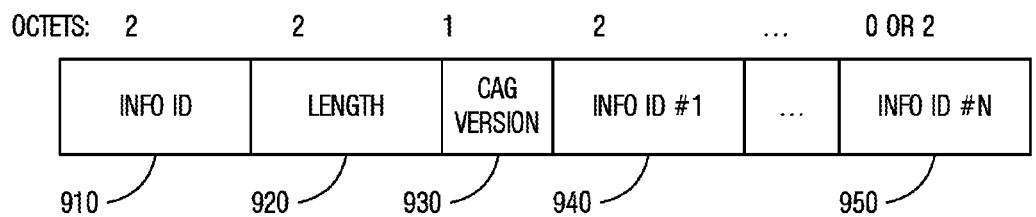
FIG. 9 illustrates an example format of CAG ANQP-element.

In Draft 802.11ai Amendment D2.0, such a "pull" mechanism was provided. The Draft 802.11ai Amendment D2.0 defined a CAG ANQP-element, which is illustrated in FIG. 9. As shown in FIG. 9, CAG ANQP-element 900 comprises Info ID field 910 containing an identifier value corresponding to CAG ANQP-element, Length field 920 indicating the total length, in octets, of the remaining fields in CAG ANQP-element 900, CAG Version field 930 containing the current CAG version number associated with the CAG, and one or more (CAG member) Info ID fields, such as Info ID field 940 and Info ID field 950, containing the identifiers of the member ANQP-elements within the CAG. The number of (CAG member) Info ID fields included in CAG ANQP-element 900 may be inferred from the value contained in Length field 920, as the length of CAG Version field 930 and the length of each (CAG member) Info ID fields (such as Info ID field 940 and Info ID field 950) are fixed. This CAG ANQP-element may be pulled (meaning requested) by an STA using the Query List ANQP-element in an ANQP query request that is encapsulated in a GAS Initial Request frame. An alternative "pull" mechanism involves the STA sending a Probe Request frame requesting the CAG Number IE to be returned and then waiting for the Probe Response. The difference between these two alternative approaches is that the Probe Request is answered by the AP, which may provide the current CAG version number but not the content of the CAG in response, while the ANQP query request is ultimately answered by the ANQP server, which may additionally provide the content of the CAG, as well as additional ANQP-elements that may be outside the CAG. Either of these two "pull" mechanisms may incur additional delay for making the NDS decision due to waiting for the response.

Vendors of STAs tend to focus on optimizing STA design for better user experience, rather than for network capacity. Very often, in practice, it means that shortening the network discovery and selection (NDS) delay has a higher priority over saving associated signaling overhead for an STA. If APs don't broadcast the CAG Number IE in the Beacon frames, implementation of STAs may very well choose to avoid probing or querying delay by ignoring the CAG information that it may have stored all together by initiating an ANQP query to get the latest CAG information from the server directly.

Figure 10:
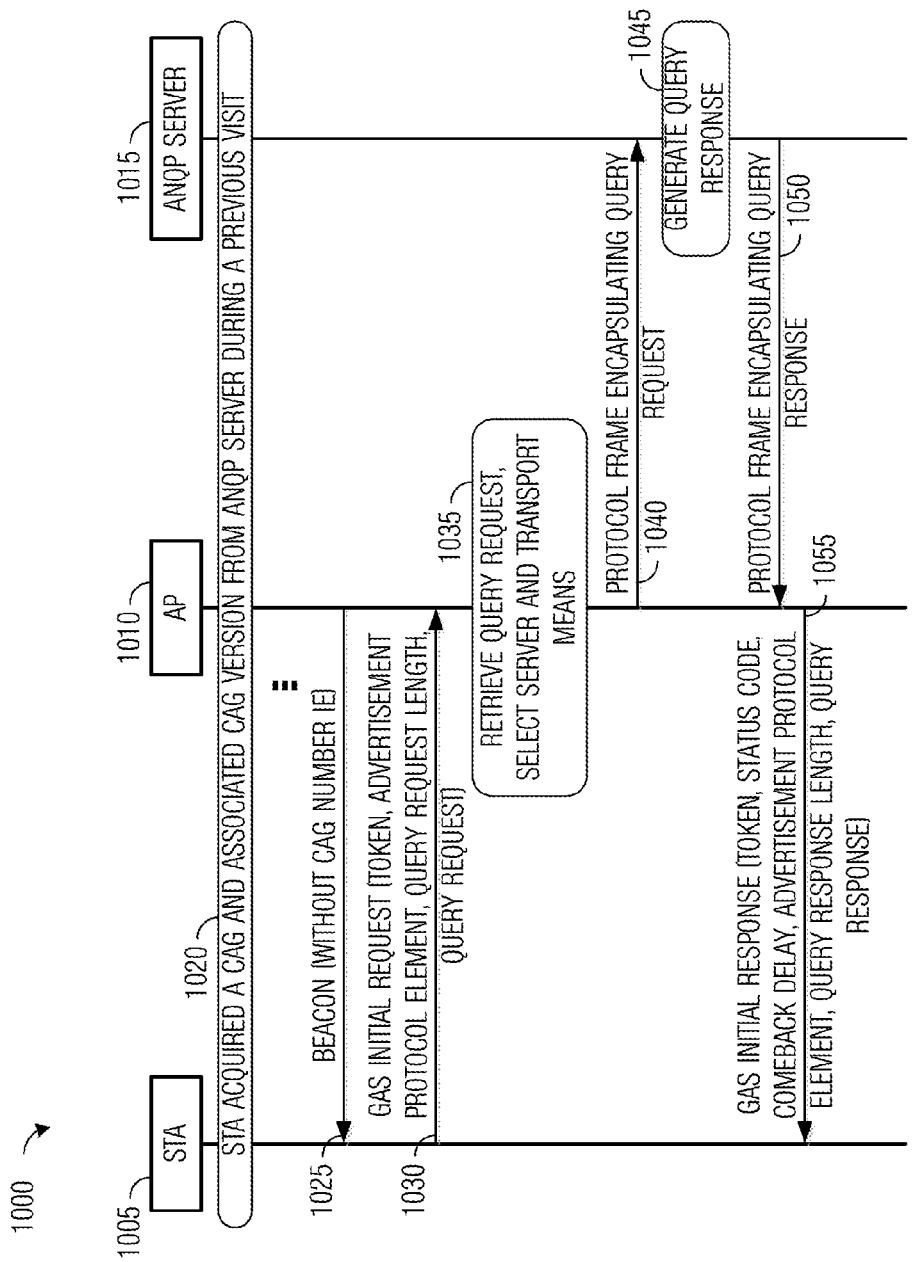
FIG. 10 illustrates a message exchange diagram 1000 highlighting an example message exchange during a network discovery process occurred among such an STA, an AP, and an ANQP server according to example embodiments described herein.

FIG. 10 illustrates a message exchange diagram 1000 highlighting an example message exchange during a network discovery process occurred among such an STA, an AP, and an ANQP server, wherein the AP doesn't include the CAG Number IE in the Beacons that are broadcasted periodically. As shown in FIG. 10, message exchange diagram 1000 illustrates an example message exchange occurred among STA 1005, AP 1010, and ANQP Server 1015, as well as operations performed by STA 1005, AP 1010, and/or ANQP Server 1015. Message exchange diagram 1000 may begin with STA 1005 acquiring a CAG and associated CAG version number from ANQP Server 1015 during a visit to AP 1010 (shown as event 1020). STA 1005 may store the CAG information (i.e., higher layer information), the CAG version number, and the AP information for later use. Then at a later time, STA 1005 revisits AP 1010 and receives a Beacon frame from AP 1010 (shown as event 1025).

Due to the concern of signaling overhead as discussed before, AP 1010 does not include the CAG Number IE in the Beacon frame. From the BSSID, which is typically the MAC address of the AP, included in the Beacon frame, STA 1005 may recognize that it stores CAG information associated with AP 1010. However, as AP 1010 didn't include the CAG Number IE in the Beacon frame, STA 1005 doesn't know if its stored CAG information associated with the AP remains valid. In order to avoid probing or querying delay, STA 1005 chooses to ignore the stored CAG information and transmits a GAS Initial Request frame to encapsulate an ANQP query request (shown as event 1030). After receiving the GAS Initial Request frame, AP 1010 retrieves the advertisement protocol ID in the Advertisement Protocol element (such as Advertisement Protocol element 320) and the query request contained in the Query Request field (such as Query Request field 360), and from the advertisement protocol ID, AP 1010 selects ANQP Server 1015 to forward the query request to, as well as a protocol frame and transport means that should be used to carry the query request between AP 1010 and ANQP Server 1015 (shown as event 1035), based on an earlier connection set up between AP 1010 and ANQP Server 1015. Diameter and RADIUS are among example protocols typically used between an AP and a server.

Then AP1010 forwards the ANQP query request to ANQP Server 1015 using the selected protocol frame and transport means (shown as event 1040). After receiving the protocol frame from AP 1010, ANQP Server 1015 retrieves the ANQP query request and generates an ANQP query response accordingly (shown as event 1045). Then, ANQP Server 1015 sends the ANQP query response to AP 1010 using another protocol frame (shown as event 1050). After receiving the response protocol frame from ANQP Server 1015, AP 1010 retrieves the ANQP query response and forwards it to STA 1005 using a GAS Initial Response frame by encapsulating the ANQP query response in a Query Response field (such as Query Response field 760) in the GAS Initial Response frame (shown as event 1055).

As illustrated in FIG. 10, STA 1005 is looking for a quick way to ensure that it has the information of the access network for it to make a network selection decision. Since AP 1010 doesn't include the CAG Number IE in the Beacon frames, STA 1005 chooses not to utilize the stored CAG information since "pulling" the current CAG version number first will incur additional delay. In practice, a large number of STAs may very well take the same strategy, thus rendering the CAG feature, as defined in Draft 802.11ai Amendment D2.0, less useful than it could be.

To overcome the drawback as described above, an enhanced signaling mechanism is provided in the example embodiments presented herein. According to an example embodiment, an STA provides the AP with a CAG version number associated with the AP that the STA has stored while initiating a GAS query request, which means the STA provides its stored CAG version number in the GAS Initial Request frame. Then, the AP compares the STA stored CAG version number with the latest CAG version number that the AP has received from the ANQP server. If the two CAG version numbers are equal, the AP short-circuits the query process by returning a GAS Initial Response frame carrying an indication to the requesting STA that the stored CAG version number (and thus the stored CAG information associated therewith) remains the same as the current one, that the requesting STA may use the stored CAG information in making the network selection decision, and that the ANQP query process is thus terminated. If the two CAG version numbers are different, the AP forwards the query request to the ANQP server as usual, and the remaining steps as in a conventional ANQP query process follow.

A design challenge for carrying STA's stored CAG version number in a GAS Initial Request frame is that it shouldn't be carried in an ANQP-element encapsulated in the Query Request field since the APs are not required to understand the content in the query request. Similarly, another design challenge for carrying an indication that the stored CAG version number is the same as the current one in a GAS Initial Response frame is that the indication shouldn't be carried in an ANQP-element encapsulated in the Query Response field. Although in an example embodiment, the AP may forge an ANQP-element and include it in the Query Response field to indicate that the stored CAG version number is the same as the current one, doing so would break the traditional protocol layering structure and add additional functional requirements on the AP. Furthermore, for advertisement protocols where query requests and query responses may be protected by end-to-end encryption between a requesting STA and a server, an AP present in the middle may not be able to forge query response successfully. Therefore, such an embodiment may not be practical. On the other hand, the fields carried within a GAS Initial Request frame other than the Query Request field and the fields carried within a GAS Initial Response frame other than the Query Response field are fixed for backward compatibility reason, meaning that adding a new field may not be an option.

According to an example embodiment, the required additional signaling is provided by reusing the existing fields in the GAS Initial Request and GAS Initial Response frames in a backward compatible manner.

Figure 11:
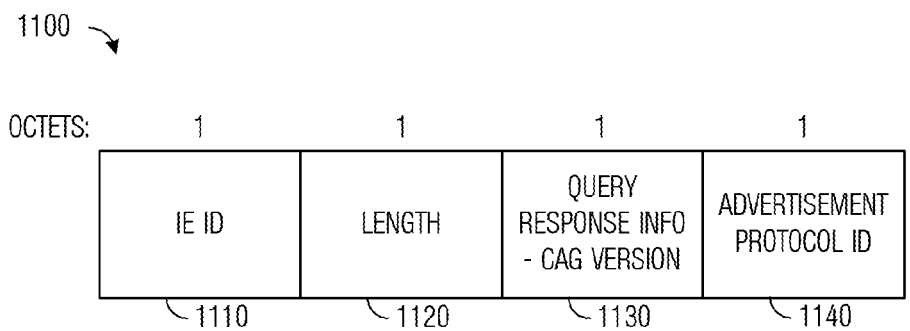
FIG. 11 illustrates a format of an example Advertisement Protocol element when the Advertisement Protocol element is included in a GAS Initial Request frame according to example embodiments described herein.

In an example embodiment, the Query Response Info field in the Advertisement Protocol element may be used to contain the STA's stored CAG version number when the Advertisement Protocol element is included in a GAS Initial Request frame. FIG. 11 illustrates a format of an example Advertisement Protocol element 1100 when the Advertisement Protocol element is included in a GAS Initial Request frame. Advertisement Protocol element 1100 is enhanced and modified from Advertisement Protocol element 320, for example. As shown in FIG. 11, the improved Advertisement Protocol element 1100 comprises IE ID field 1110, which contains a same element identifier value as an Advertisement Protocol element does currently (such as Advertisement Protocol element 320), Length field 1120 indicating the total length, in octets, of remaining fields in the element, Query Response Info—CAG Version field 1130, and Advertisement Protocol ID field 1140. The definition and value of Advertisement Protocol ID field 1140 are the same as those of Advertisement Protocol ID field currently (such as Advertisement Protocol ID field 331). If included in a GAS Initial Request frame, Query Response Info—CAG Version field 1130 contains the STA's stored CAG version number if the STA stores a CAG (i.e., the higher layer information) and the associated CAG version number corresponding to the AP and to the advertisement protocol being used; otherwise, it is set to a value of zero if the STA doesn't have a stored CAG or the associated CAG version number corresponding to the AP or to the advertisement protocol being used. This is consistent with the notion in Draft 802.11ai Amendment D2.0 that zero is not a valid CAG version number. It should be noted that a CAG version number is also associated with the advertisement protocol being used. Therefore, a CAG version number contained in Query Response Info—CAG Version field 1130 is associated with an advertisement protocol indicated by the value contained in Advertisement Protocol ID field 1140. If included in a Beacon, Probe Response, GAS Initial Response, or Gas Comeback Response frame, Query Response Info—CAG Version field 1130 contains Query Response Info field, which consists of a 7-bit Query Response Length Limit subfield (such as Query Response Length Limit subfield 327) and a 1-bit PAME-BI subfield (such as PAME-BI subfield 329).

In an alternative example embodiment, as opposed to modifying the existing Query Response Info field (such as Query Response Info field 325), a requesting STA may include a CAG Number IE in the GAS Initial Request frame to indicate its stored CAG version number to the AP. However, this CAG Number IE shall be inserted in the GAS Initial Request frame after the Query Request field (such as Query Request field 360) in order to maintain backward compatibility and shall not be counted as a part of the Query Request field (meaning that the value in the Query Request Length field shall not count the CAG Number IE as a part of the Query Request field), since the AP is not required to interpret the content inside the Query Request field.

In another example embodiment, a new Status Code value contained in a Status Code field (such as Status Code field 720) in a GAS Initial Response frame is used to indicate to the requesting STA that the current CAG version number remains the same as the STA's stored CAG version number. Such a new Status Code value also serves as an indication to the requesting STA that its stored CAG information is still valid for making a decision such as a network selection decision and the query process that the STA has initiated is thus terminated.

Figure 12:
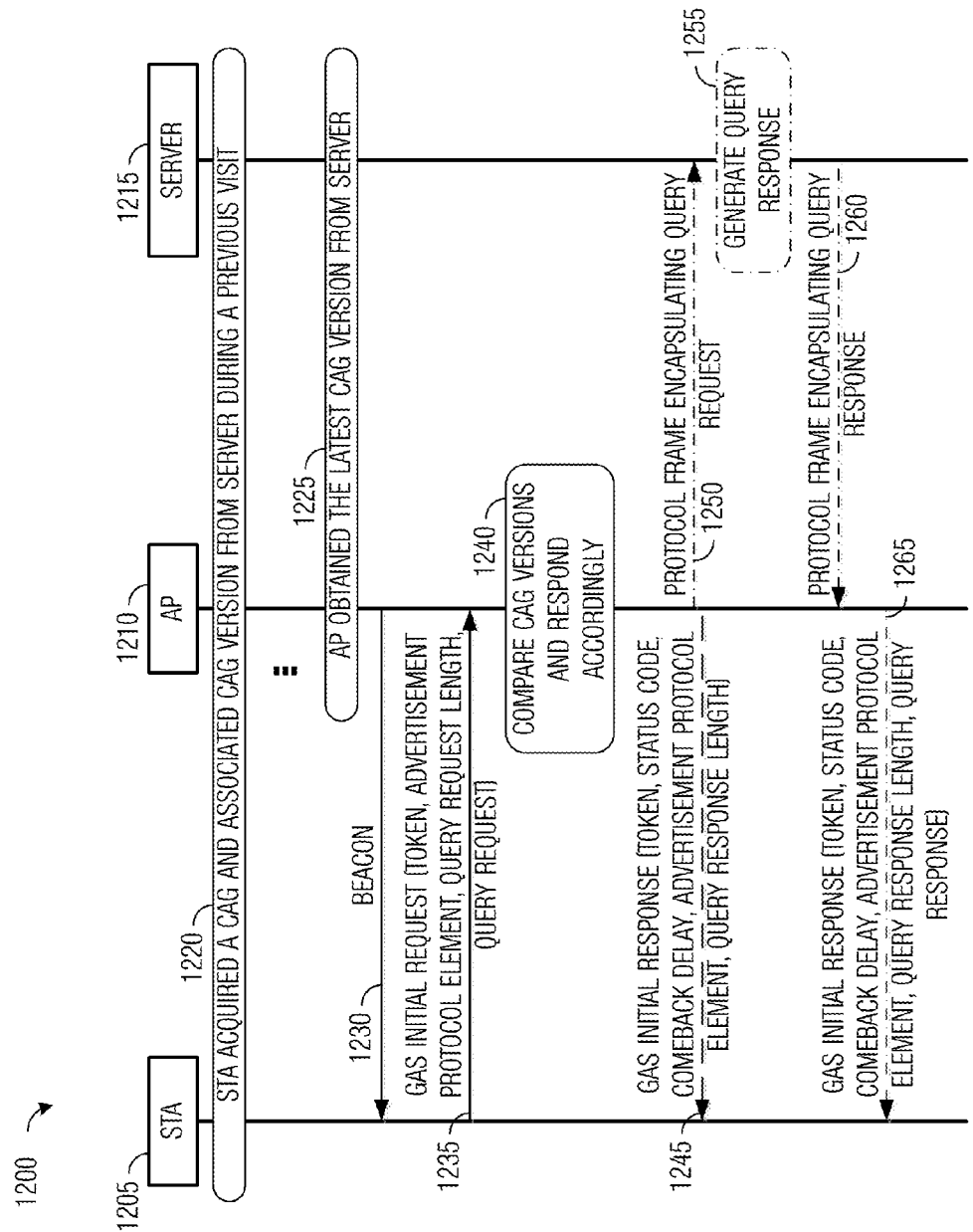
FIG. 12 illustrates a message exchange diagram highlighting an example message exchange during a network discovery, service discovery, or information discovery process occurred among an STA, an AP, and a server according to example embodiments described herein.

FIG. 12 illustrates a message exchange diagram 1200 highlighting an example message exchange during a network discovery, service discovery, or information discovery process occurred among an STA, an AP, and a server, wherein the STA and the AP supports the enhanced signaling mechanism as described herein. As shown in FIG. 12, message exchange diagram 1200 illustrates an example message exchange occurred among STA 1205, AP 1210, and Server 1215, as well as operations performed by STA 1205, AP 1210, and/or Server 1215. The advertisement protocol used between STA 1205 and Server 1215 may be ANQP or other advertisement protocol such as RLQP or the Pre-association Discovery Protocol (PADP) that is yet to be defined by 802.11aq project or any other yet to-be-defined advertisement protocol that may use GAS frames or any to-be-defined Public Action frames as Layer 2 transport means. Thus, Server 1215 may be an ANQP server, an RLQP server, a PADP proxy or server, and the like, or a server that supports a plurality of these protocols.

Message exchange diagram 1200 may begin with STA 1205 acquiring CAG information (i.e., the higher layer information) and associated CAG version number from Server 1215 during a visit to AP 1210 (shown as event 1220). STA 1205 may store the CAG information, the CAG version number, the scope value, and the AP/server information (such as an identifier of the AP, the advertisement protocol used by the server, etc.) for later use. Meanwhile, AP 1210 may obtain an update of the latest CAG version number from Server 1215 periodically or when a change in the CAG version number occurs (shown as event 1225). Then at a later time, STA 1205 may revisit AP 1210 and receives a Beacon frame from AP 1210 (shown as event 1230). Due to the concern regarding signaling overhead as discussed before, AP 1210 may not include the CAG Number IE in the Beacon frame. From the BSSID included in the Beacon frame, STA 1205 may recognize that it has stored the CAG information and associated CAG version number associated with AP 1210. STA 1205 may send a GAS Initial Request frame to AP 1210 (shown as event 1235). The GAS Initial Request frame may include the stored CAG version number, which is associated with AP 1210 and associated with the advertisement protocol being used (as indicated by the value contained in Advertisement Protocol ID field 1130, for example), in a Query Response Info—CAG Version field (such as Query Response Info—CAG Version field 1130, for example). The GAS Initial Request frame may further encapsulate a query request, which STA 1205 would normally request, in a Query Request field (such as Query Request field 360, for example).

After receiving the GAS Initial Request frame from STA 1205, AP 1210 may compare the STA's stored CAG version number with the latest CAG version number (associated with the same advertisement protocol as indicated by the value contained in Advertisement Protocol ID field 1130 in the received GAS Initial Request frame) that AP 1210 received from Server 1215, in event 1225, for example (shown as event 1240). If AP 1210 determines that the two CAG version numbers are equal, AP 1210 may send a GAS Initial Response frame to STA 1205, the GAS Initial Response frame may include, in a Status Code field (such as Status Code field 720, for example), a Status Code value, which indicates that the stored CAG version number is the same as the current CAG version number that the AP has, that the stored CAG is still valid for making a decision (such as a network selection decision, a service selection decision, a peer device selection decision, etc.), and that the query request initiated by the requesting STA is thus terminated (shown as event 1245). The GAS Initial Response frame that AP 1210 sends in event 1245 does not include a Query Response field. A value of zero contained in a Query Response Length field (such as Query Response Length field 750) indicates that the Query Response field is not included in the GAS Initial Response frame. After receiving the GAS Initial Response frame, STA 1205 may terminate the query process. STA 1205 may proceed with making a decision or may initiate query processes to other APs and/or other servers before making a decision on how to proceed with the network selection process.

If AP 1210 determines that the two CAG version numbers are not equal in event 1240, AP 1210 may retrieve the query request contained in the Query Request field (such as Query Request field 360, for example) in the GAS Initial Request frame. From the advertisement protocol ID contained in Advertisement Protocol ID field 1130, AP 1210 selects Server 1215 to forward the query request to, as well as the protocol frame and transport means that should be used to carry the query request between AP 1210 and Server 1215. Then, AP 1210 may forward the query request to Server 1215 using the selected protocol frame and transport means (shown as event 1250). After receiving the protocol frame from AP 1210, Server 1215 retrieves the query request from the protocol frame and generates a query response accordingly (shown as event 1255). Then, Server 1215 sends the query response to AP 1210 using another protocol frame (shown as event 1260).

After receiving the response protocol frame from Server 1215, AP 1210 may retrieve the query response and forwards it to STA 1205 using a GAS Initial Response frame if the query response is not over-sized, by encapsulating the query response in a Query Response field (such as Query Response field 760, for example) in the GAS Initial Response frame (shown as event 1265). Then, the query process may end. If the query response is over-sized, AP 1210 fragments the query response into multiple GAS Comeback Response frames and sends a GAS Initial Response frame to invite the requesting STA to request to receive the multiple GAS Comeback Response frames in order to retrieve the whole query response. STA 1205 then sends a GAS Comeback Request frame, receives a GAS Comeback Response frame in response, and repeats these steps until the GAS Comeback Response frame carrying the last fragment of the query response is received. Then, STA 1205 may reassemble the query response. After that, the query process may end.

As illustrated in FIG. 12, STA 1205 is motivated to provide its stored CAG version number, since if the STA's stored CAG version number is the same as the current one, AP 1210 can short-cut the query process (shown as event 1245) so that STA 1205 can make a decision (e.g., on network selection) earlier for better user experience. Even if the STA's stored CAG version number is different from the current one, AP 1210 still faithfully forwards the query request to Server 1215. STA 1205 is losing no time in getting the up-to-date query response from Server 1215. Therefore, by using the enhanced signaling mechanism as illustrated in the example embodiments presented herein, more STAs will be motivated to utilize the CAG information that they have stored.

It is noted that the GAS Initial Response frame transmitted in event 1245 doesn't include a Query Response field. Comparing to using Probe Request and Probe Response frames to obtain the current CAG version number as described previously, it is a quite efficient alternative, in the sense of signaling overhead, to use a GAS Initial Request frame to supply a stored CAG version number and to receive a GAS Initial Response frame with an indication if the stored CAG version number is the same as the current on or not. However, some changes need to be made on the GAS Initial Request frame. Currently as defined in IEEE Standard 802.11-2012 and Draft 802.11ai Amendment D2.0, a GAS Initial Request frame shall include the Query Request field, where the query request of an advertisement protocol is encapsulated. Thus, a value of zero in the Query Request Length field in a GAS Initial Request frame is not allowed today.

According to an alternative example embodiment of the enhanced signaling mechanism, a GAS Initial Request frame without a Query Request field and a GAS Initial Response frame without a Query Response field are used as an alternative to using the Probe Request and Probe Response frames to pull the CAG version number. Strictly speaking, it is not a "pull" mechanism, as the requesting STA doesn't get the current CAG version number. Instead, it merely gets an indication if its stored CAG version number is the same as the current one or not by the STA supplying its stored CAG version number to the AP using the GAS Initial Request frame and by the AP providing the indication in response.

Figure 13:
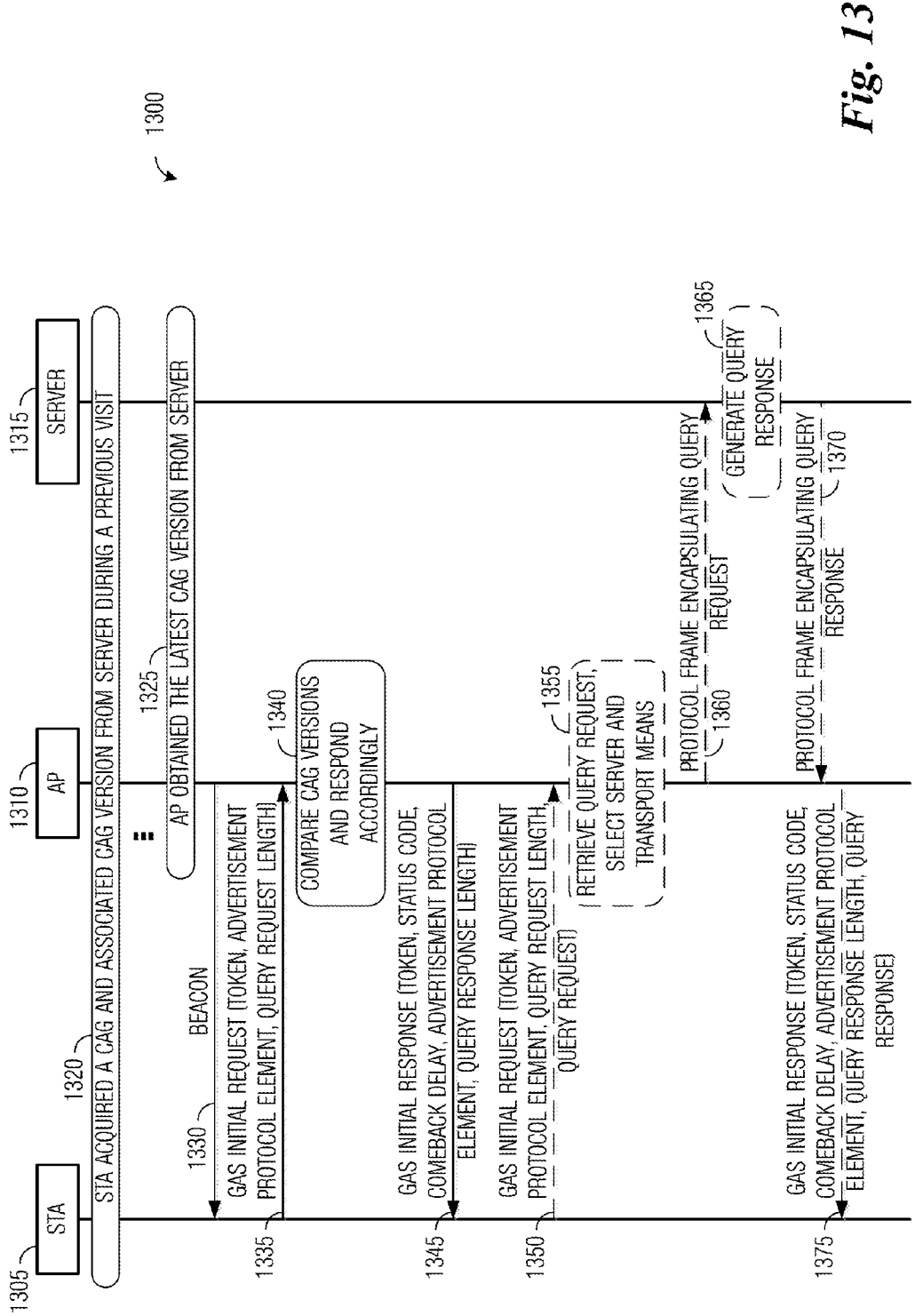
FIG. 13 illustrates a message exchange diagram highlighting an alternative example message exchange during a network discovery, service discovery, or information discovery process occurred among an STA, an AP, and a server, where the STA is also optimized for saving network capacity by using signaling overhead efficiently according to example embodiments described herein.

FIG. 13 illustrates a message exchange diagram 1300 highlighting an alternative example message exchange during a network discovery, service discovery, or information discovery process occurred among an STA, an AP, and a server, wherein the STA and the AP supports the enhanced signaling mechanism and the STA is also optimized for saving network capacity by using signaling overhead efficiently. As shown in FIG. 13, message exchange diagram 1300 illustrates an example message exchange occurred among STA 1305, AP 1310, and Server 1315, as well as operations performed by STA 1305, AP 1310, and/or Server 1315. Message exchange diagram 1300 may begin with STA 1305 acquiring a CAG and the associated CAG version number from Server 1315 during a visit to AP 1310 (shown as event 1320). STA 1305 may store the CAG information, the CAG version number, the scope value, and the AP/server information for later use. Meanwhile, AP 1310 may get an update of the latest CAG version number from Server 1315 periodically or when a change on the CAG version number occurs (shown as event 1325).

Then at a later time, STA 1305 may revisit AP 1310 and receives a Beacon frame from AP 1310 (shown as event 1330). Due to the concern of signaling overhead as discussed before, AP 1310 may not include the CAG Number IE in the Beacon frame. From the BSSID included in the Beacon frame, STA 1305 may recognize that it has stored the CAG information and associated CAG version number associated with AP 1310. Then, STA 1305 may send a GAS Initial Request frame to AP 1310, including its stored CAG version number, which is associated with the AP and associated with the advertisement protocol being used (as indicated by the value contained in Advertisement Protocol ID field 1130), in a Query Response Info—CAG Version field (such as Query Response Info—CAG Version field 1130) and without including a Query Request field (shown as event 1335). A value of zero contained in a Query Request Length field (such as Query Request Length field 340) indicates that a Query Request field is not included and the GAS Initial Request frame is sent to request an indication of whether the STA's stored CAG version number is the same as the current CAG version number that AP 1310 has.

After receiving the GAS Initial frame from STA 1305, AP 1310 may compare the STA's stored CAG version number with the latest CAG version number (of the same advertisement protocol as indicated by the value contained in Advertisement Protocol ID field 1130 in the received GAS Initial Request frame) that AP 1310 received from Server 1315, in event 1325, for example (shown as event 1340). Then, according to the comparison result, AP 1310 sends a GAS Initial Response frame to STA 1305 (shown as event 1345). If AP 1310 determines that the two CAG version numbers are equal, AP 1310 may include, in a Status Code field (such as Status Code field 720, for example), a first Status Code value that indicates the stored CAG version number is the same as the current CAG version number that the AP has. If AP 1310 determines that the two CAG version numbers are not equal, AP 1310 includes, in the Status Code field (such as Status Code field 720), a second Status Code value that indicates the stored CAG version number is different from the current CAG version number that the AP has.

After receiving the GAS Initial Response frame from AP 1310, if the first Status Code value is contained in the Status Code field, STA 1305 may terminate the query process. STA 1205 may proceed with making a decision or may initiate query processes to other APs and/or other servers before making a decision on how to proceed with the network selection process. If the second Status Code value is contained in the Status Code field, STA 1305 knows that its stored CAG information is obsolete. Thus, STA 1305 may initiate a normal query request to obtain the up-to-date CAG information (shown as event 1350). And the remaining events of a normal query process such as events 1355, 1360, 1365, 1370, and 1375 follow. As shown in FIG. 13, STA 1305, comparing to STA 1205 as illustrated in FIG. 12, may save some signaling overhead (due to the query request being excluded from the GAS Initial Request frame) in event 1335 if the two CAG version numbers are the same, but takes a risk of incurring a longer delay (than STA 1205) if the two CAG version numbers are different.

Currently in IEEE Standard 802.11-2012 and in Draft 802.11ai Amendment D2.0, when the Advertisement Protocol element is included in a GAS Initial Request frame, the Query Response Info field is set to zero and an AP receiving this Query Response Info field shall ignore it. Thus, a legacy AP (e.g., capable of using GAS frames but not capable of using the CAG features or the signaling enhancements) receiving the GAS Initial Request frame in event 1235 will forward the query request to the server based on legacy 802.11u rules. Although the stored CAG version number that the STA provided may be wasted, but the 802.11u query process remains intact. Actually, if the requesting STA knows the AP is a legacy AP, e.g. from the capabilities indicated in the Beacon or Probe Response, the STA may avoid sending its stored CAG version number in the GAS Initial Request frame by setting the Query Response Info—CAG Version field to zero. This is consistent with Draft 802.11ai Amendment D2.0 that zero is not a valid CAG version number. Instead, a value of zero in the Query Response Info—CAG Version field in a GAS Initial Request may be used by an STA, which supports the enhanced signaling mechanism, to indicate (and may be interpreted by an AP, which supports the enhanced signaling mechanism) that the STA doesn't have a stored CAG version number for the AP and the associated advertisement protocol. As a legacy STA (e.g., capable of using GAS frames but not capable of using the CAG feature or the signaling enhancements) sending a GAS Initial Request frame will set the Query Response Info field to zero, the AP, which supports the enhanced signaling mechanism, will treat it as if that the STA doesn't have a stored CAG version number for the AP and the associated advertisement protocol. Therefore, the AP will not short-circuit the query process. Therefore, in summary, the example embodiments presented herein do not have a backward compatibility issue with legacy APs or legacy STAs. A communications system made with these example embodiments can co-exist with legacy APs and legacy STAs.

Figure 14A:
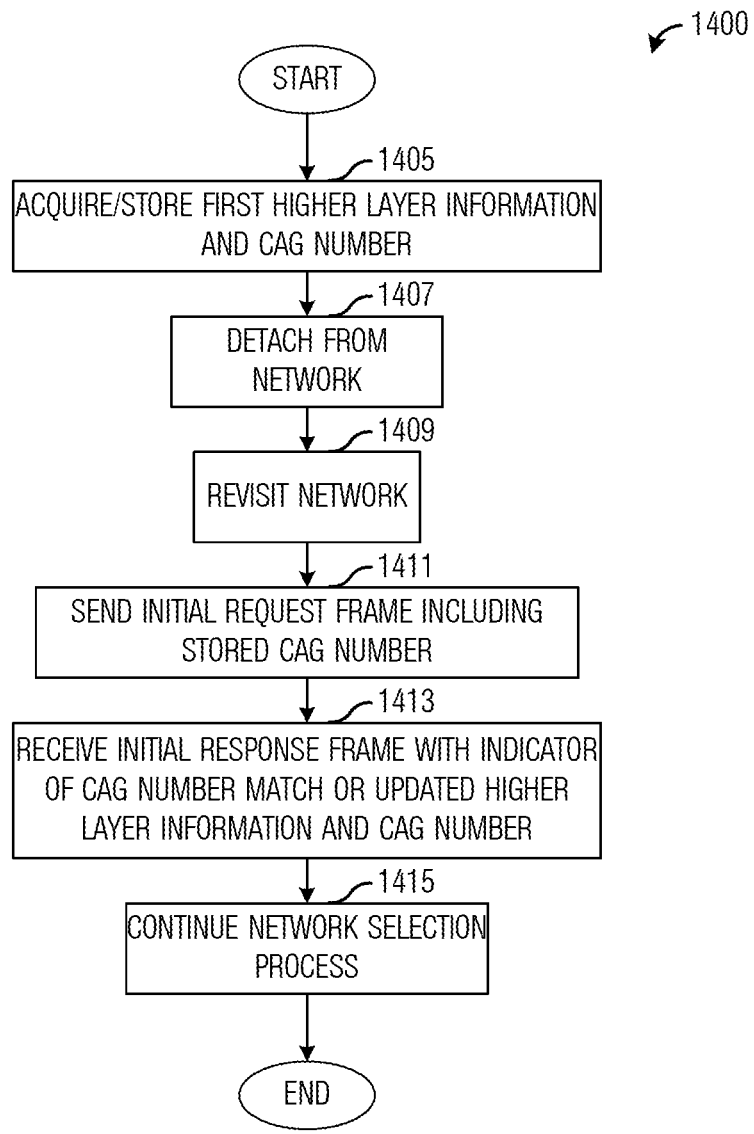
FIG. 14a illustrates a flow diagram of first example operations 1400 occurring in a STA participating a network discovery, service discovery, or information discovery process according to example embodiments described herein.

FIG. 14a illustrates a flow diagram of first example operations 1400 occurring in a STA participating a network discovery, service discovery, or information discovery process. Operations 1400 may be indicative of operations occurring in a STA as the STA participates in a network discovery, service discovery, or information discovery process. Operations 1400 may correspond to message exchange diagram 1200.

Operations 1400 may begin with the STA acquiring first higher layer information and CAG number from a server (block 1405). The first higher layer information and CAG number may be associated with a network, a service, a database, and the like. The STA may disconnect from the network (block 1407). At a later time, the STA may revisit the network, which it may identify according to the BSSID included in the Beacon frame transmitted by an AP, for example (block 1409). The STA may send a GAS Initial Request frame including the stored CAG version number (block 1411). The STA may receive a GAS Initial Response frame with an indicator that indicates if the stored CAG version number matches the current CAG version number (block 1413). The indicator may be located in a Status Code field of the GAS Initial Response frame. If the stored CAG version number matches the current CAG version number, the GAS Initial Response frame does not include any higher layer information. If the stored CAG version number does not match the current CAG version number, the GAS Initial Response frame received by the STA may include higher layer information and the current CAG number in a Query Response field. The STA may continue with the network selection process (block 1415).

Figure 14B:
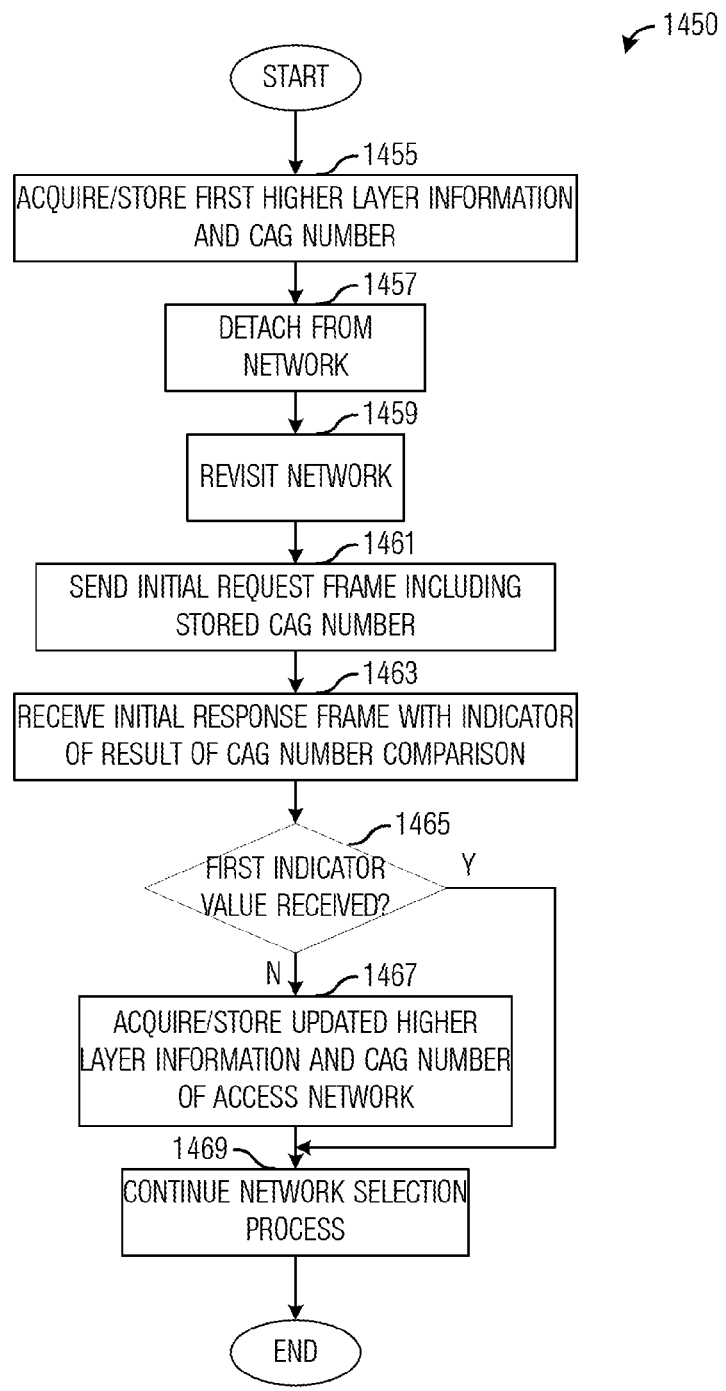
FIG. 14b illustrates a flow diagram of second example operations 1450 occurring in a STA participating a network discovery, service discovery, or information discovery process according to example embodiments described herein.

FIG. 14b illustrates a flow diagram of second example operations 1450 occurring in a STA participating a network discovery, service discovery, or information discovery process. Operations 1450 may be indicative of operations occurring in a STA as the STA participates in a network discovery, service discovery, or information discovery process. Operations 1450 may correspond to message exchange diagram 1300.

Operations 1450 may begin with the STA acquiring first higher layer information and CAG number from a server (block 1455). The first higher layer information and CAG number may be associated with a network, a service, a database, and the like. The STA may disconnect from the network (block 1457). At a later time, the STA may revisit the network, which it may identify according to the BSSID included in the Beacon frame transmitted by an AP, for example (block 1459). The STA may send a GAS Initial Request frame including the stored CAG version number (block 1461). The STA may receive a GAS Initial Response frame with an indicator that indicates if the stored CAG version number is the same as the current CAG version number (block 1463). The indicator may be located in a Status Code field of the GAS Initial Response frame. If the stored CAG version number matches the current CAG version number, a first indicator value is included in the GAS Initial Response frame, e.g., contained in the Status Code field; otherwise, a second indicator value is included in the GAS Initial Response frame, e.g., contained in the Status Code field.

The STA may perform a check on the indicator (e.g. the value contained in the Status Code field) in the received GAS Initial Response frame to determine if the first indicator value is received (block 1465). If the first indicator value is received (e.g., in the Status code field), indicating that the stored CAG version number matches the current CAG version number, the STA may continue with the network selection process (block 1469). If the first indicator value is not received, indicating that the stored CAG version number does not match the current CAG version number, the STA may acquire and store up-to-date higher layer information (the updated CAG information) and the current CAG version number from the AP (block 1467). As an illustrative example, the STA may perform a normal query request to obtain the updated higher layer information (the updated CAG information) and the current CAG version number from the AP. The STA may continue with the network selection process (block 1469).

Figure 15A:
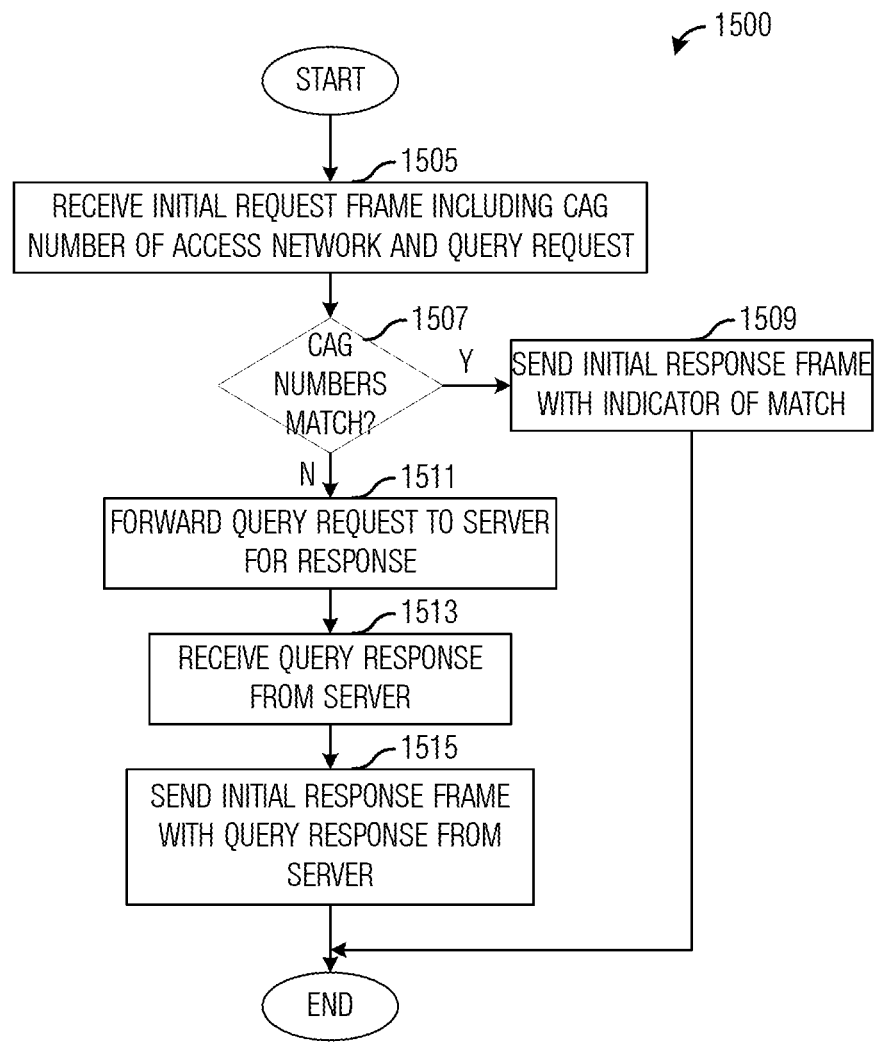
FIG. 15a illustrates a flow diagram of first example operations 1500 occurring in an AP participating in a network discovery, service discovery, or information discovery process according to example embodiments described herein.

FIG. 15a illustrates a flow diagram of first example operations 1500 occurring in an AP participating in a network discovery, service discovery, or information discovery process. Operations 1500 may be indicative of operations occurring in an AP as the AP participates in a network discovery, service discovery, or information discovery process. Operations 1500 may correspond to message exchange diagram 1200.

Operations 1500 may begin with the AP receiving a GAS Initial Request frame including a stored CAG version number stored at a STA (block 1505). The AP may perform a check to determine if the stored CAG version number from the GAS Initial Request frame matches with a current CAG version number that is associated with the same advertisement protocol (block 1507). If the two CAG version numbers match, the AP may send a GAS Initial Response frame with an indicator indicating that the two CAG version numbers match (block 1509). If the two CAG version numbers do not match, the AP may retrieve a query request from the GAS Initial Request frame and forward the query request to a server to solicit for a response (block 1511). The AP may receive the response from the server (block 1513). The response from the server may include a query response for the requesting STA. The content of the query response may include the up-to-date CAG version number and the higher layer information, which may be transparent to the AP. The AP may retrieve the query response from the response received from the server and send a GAS Initial Response frame with the query response (block 1515).

Figure 15B:
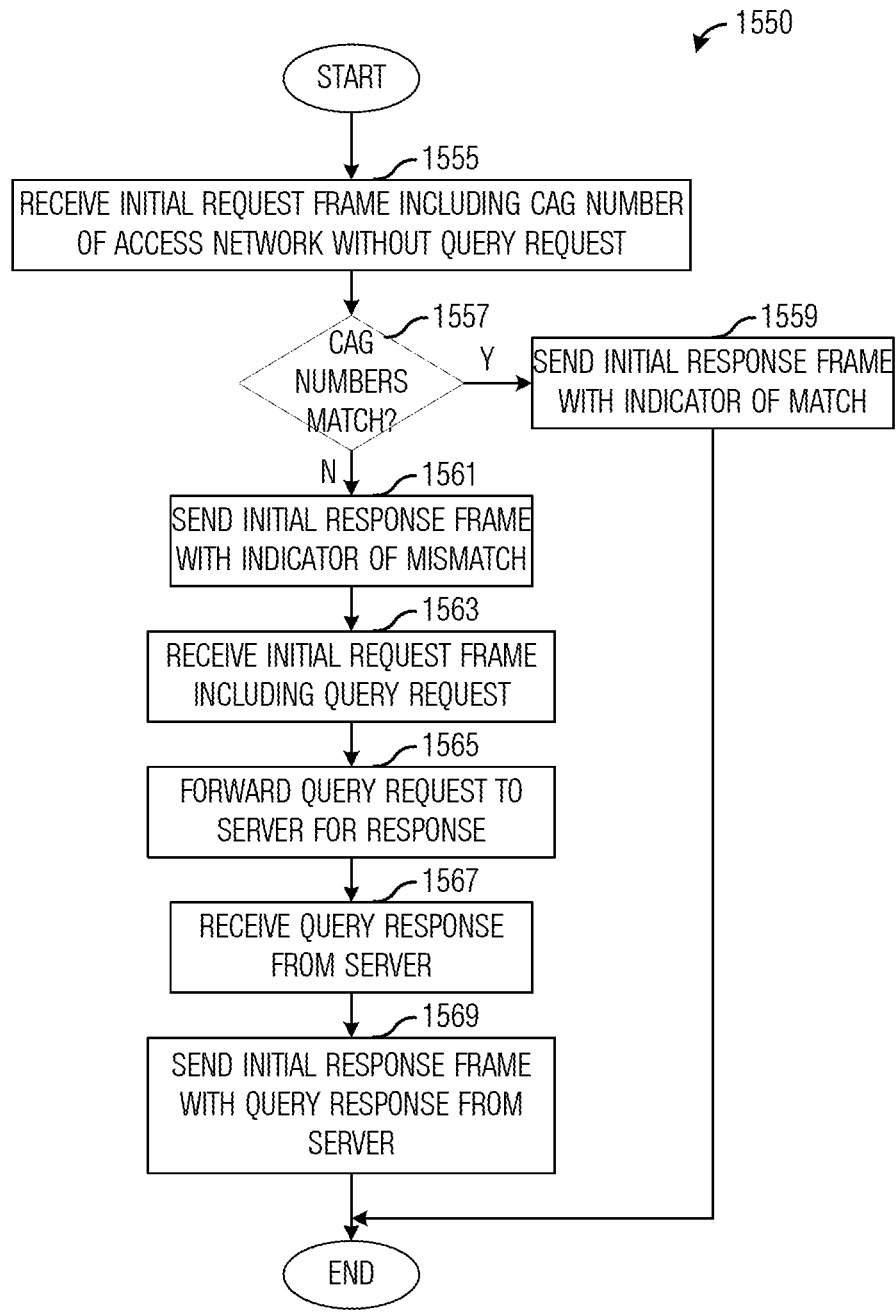
FIG. 15b illustrates a flow diagram of second example operations 1550 occurring in an AP participating in a network discovery, service discovery, or information discovery process according to example embodiments described herein.

FIG. 15b illustrates a flow diagram of second example operations 1550 occurring in an AP participating in a network discovery, service discovery, or information discovery process. Operations 1550 may be indicative of operations occurring in an AP as the AP participates in a network discovery, service discovery, or information discovery process. Operations 1550 may correspond to message exchange diagram 1300.

Operations 1550 may begin with the AP receiving a first GAS Initial Request frame including a stored CAG version number stored at a STA (block 1555). The first GAS initial Request frame may not include a query request, e.g., the Query Request Length field contains a value of zero and the Query Request field is null. The AP may perform a check to determine if the stored CAG version number from the GAS Initial Request frame matches with a current CAG version number associated with the same advertisement protocol (block 1557). If the two CAG version numbers match, the AP may send a first GAS Initial Response frame with an indicator indicating that the two CAG version numbers match (block 1559).

If the two CAG version numbers do not match, the AP may send the first GAS Initial Response frame with an indicator indicating that the two CAG version numbers do not match (block 1561). The AP may receive a second GAS Initial Request frame including a query request (block 1563). The content of the query request, which may be transparent to the AP, may include a request for up-to-date CAG version number and higher layer information (CAG information). The AP may retrieve the query request from the second GAS Initial Request frame and forward the query request to a server for a response (block 1565). The AP may receive the response from the server (block 1567). The response from the server may include a query response for the requesting STA. The content of the query response, which may be transparent to the AP, may include the up-to-date CAG version number and the higher layer information (CAG information). The AP may retrieve the query response from the response received from the server and send a second GAS Initial Response frame with the query response (block 1569).

Figure 16:
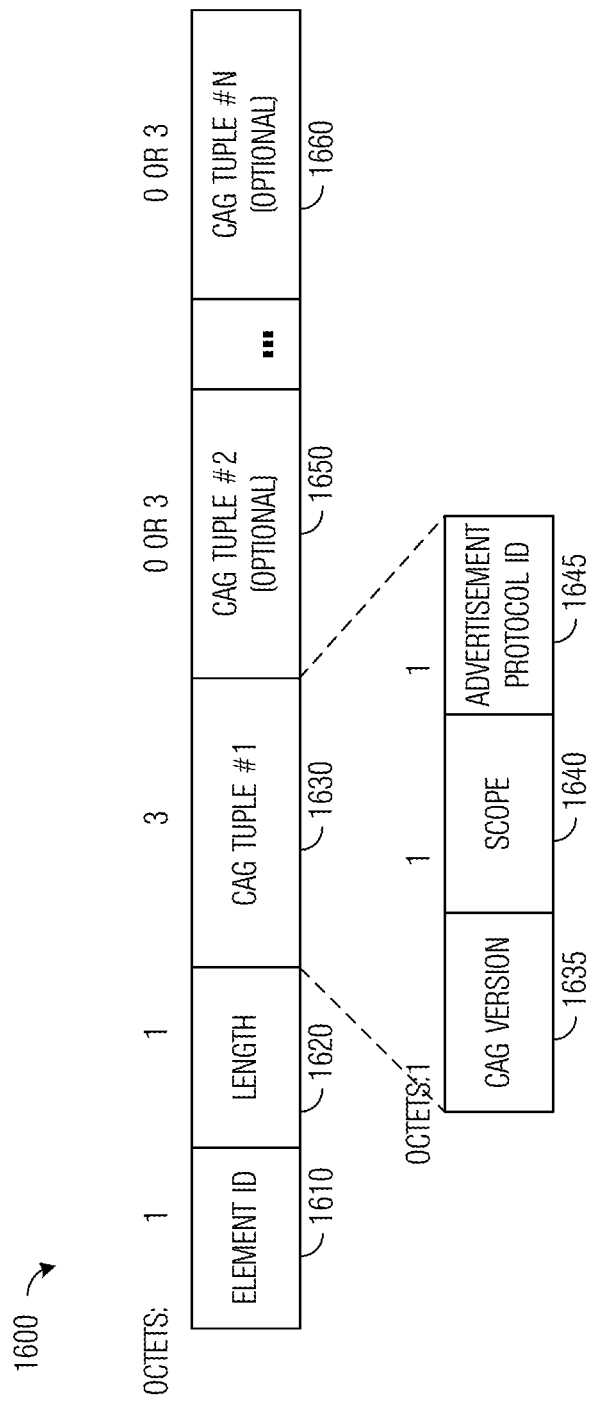
FIG. 16 illustrates an example CAG Number IE 1600 by including an ID of the advertisement protocol associated with the CAG version number according to example embodiments described herein.

It has been noted before that the CAG number is also associated with the advertisement protocol being used. Therefore, when an AP advertises a current CAG version number using the CAG Number IE included in the Beacon or Probe Response frames, the AP should also indicate the advertisement protocol associated with that CAG version number. FIG. 16 illustrates an example CAG Number IE 1600 by including an ID of the advertisement protocol associated with the CAG version number. As shown in FIG. 16, CAG Number IE 1600 comprises IE ID field 1610 containing an element identifier value corresponding to the CAG Number element, Length field 1620 indicating the total length, in octets, of remaining fields in the element, one or more CAG Tuple fields such as CAG Tuple field 1630, CAG Tuple field 1650, and CAG Tuple field 1660. Each CAG Tuple field (such as CAG Tuple field 1630) comprises a 1-octet CAG Version subfield (such as CAG Version subfield 1635), a 1-octet Scope subfield (such as Scope subfield 1640), and a 1-octet Advertisement Protocol ID subfield (such as Advertisement Protocol ID subfield 1645). The number of CAG Tuple fields included in CAG Number element 1600 may be inferred from the value contained in Length field 1620.

Figure 17:
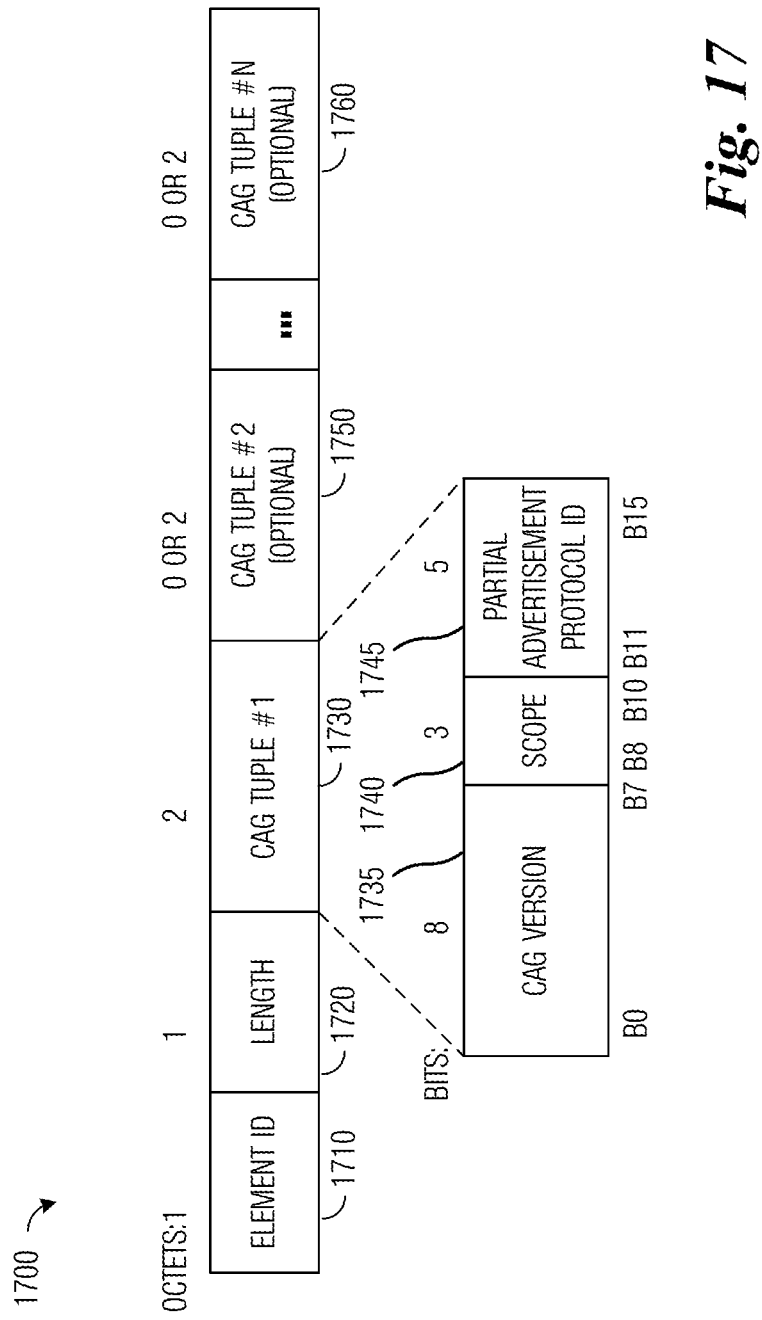
FIG. 17 illustrates an example alternative embodiment CAG Number IE according to example embodiments described herein.

FIG. 17 illustrates an example alternative embodiment CAG Number IE 1700. As shown in FIG. 17, CAG Number IE 1700 comprises an IE ID 1710 containing an element identifier value corresponding to the CAG Number element, Length field 1720 indicating the total length, in octets, of remaining fields in the element, one or more CAG Tuple fields such as CAG Tuple field 1730, CAG Tuple field 1750, and CAG Tuple field 1760. Each CAG Tuple field (such as CAG Tuple field 1730) comprises a 1-octet CAG Version subfield (such as CAG Version subfield 1735), a 3-bit Scope subfield (such as Scope subfield 1740), and a 5-bit Partial Advertisement Protocol ID subfield (such as Partial Advertisement Protocol ID subfield 1745). The number of CAG Tuple fields included in CAG Number element 1700 may be inferred from the value contained in Length field 1720. CAG Number IE 1700 differs from CAG Number IE 1600 in that the 1-octet Advertisement Protocol ID subfield (such as Advertisement Protocol ID subfield 1645) is replaced with a 5-bit Partial Advertisement Protocol ID subfield 1745, the 1-octet Scope subfield (such as Scope subfield 1640) is replaced with a 3-bit Scope subfield 1740, and these two subfields are combined into one 1-octet. Therefore, each CAG Tuple field in CAG Number IE 1700 is 2-octet long, instead of 3-octet long as in CAG Number IE 1600. The 5-bit Partial Advertisement Protocol ID may be the first 5 bits (i.e., the 5 least significant bits) of the 1-octet Advertisement Protocol ID as defined today, which means only 32 1-octet Advertisement Protocol IDs in total may be allocated in order to avoid possible overlapping among their Partial Advertisement Protocol IDs. As an illustrative example, if the CAG version number contained in the CAG Version subfield (such as CAG Version subfield 1735) is associated with ANQP, then the Partial Advertisement Protocol ID subfield within the same CAG Tuple field (such as Partial Advertisement Protocol ID subfield 1745) contains a value of 0 (or 00000 if expressed in binary), since the full Advertisement Protocol ID for ANQP is 0 (or 00000000 if expressed in binary).

Table 1 below provides a number of example advertisement protocols and their associated full Advertisement Protocol ID values and Partial Advertisement Protocol ID values, all expressed in decimal, applicable to the example formats illustrated in FIGS. 16 and 17, respectively.

TABLE 1

| Advertisement Protocol Name | Advertisement Protocol ID Value | Partial Advertisement Protocol ID Value |
| --- | --- | --- |
| Access network query protocol (ANQP) | 0 | 0 |
| MIH Information Service | 1 | 1 |
| MIH Command and Event Services Capability Discovery | 2 | 2 |
| Emergency Alert System (EAS) | 3 | 3 |
| Registered location query protocol (RLQP) | 4 | 4 |
| Pre-association Discovery Protocol (PADP) | 5 | 5 |
| Reserved | 6-220 | 6-26 |
| Vendor Specific | 221 | 27 |
| Reserved | 222-255 | 28-31 |

The number of scope values that can be defined by the 3-bit Scope subfield (such as Scope subfield 1740) is also reduced to 8, comparing to 256 by a 1-octet long Scope subfield (such as Scope subfield 1640) value. Since the number of scope values of the 3-bit Scope subfield is significantly reduced, one possible solution is to re-interpret the meaning of each scope value contained in the 3-bit Scope subfield based on the corresponding Partial Advertisement Protocol ID value that is included in the same CAG Tuple field. As an illustrative example, if the Partial Advertisement Protocol ID indicates that the associated advertisement protocol is ANQP, a value of 0 in the 3-bit Scope subfield may indicate that the CAG number is BSS specific, a value of "1" may indicate that the CAG number is common within the same HESSID, a value of "2" may indicate that the CAG number is common within the same extended service set (ESS) area, and values of 3 to 7 may be reserved for the Scope subfield for ANQP; meanwhile, if the Partial Advertisement Protocol ID indicates that the associated advertisement protocol is RLPQ (for TV White Space technology), a value of 0, 1, 2, 3, 4, or 5 in the 3-bit Scope subfield may indicate that the CAG Number associated with a TV White Space database or map of channel availability is common nation-wide, state-wide, county-wide, city-wide, ESS-wide, or BSS-wide, respectively, and values of 6 and 7 may be reserved for the Scope subfield for RLQP.

Figure 18:
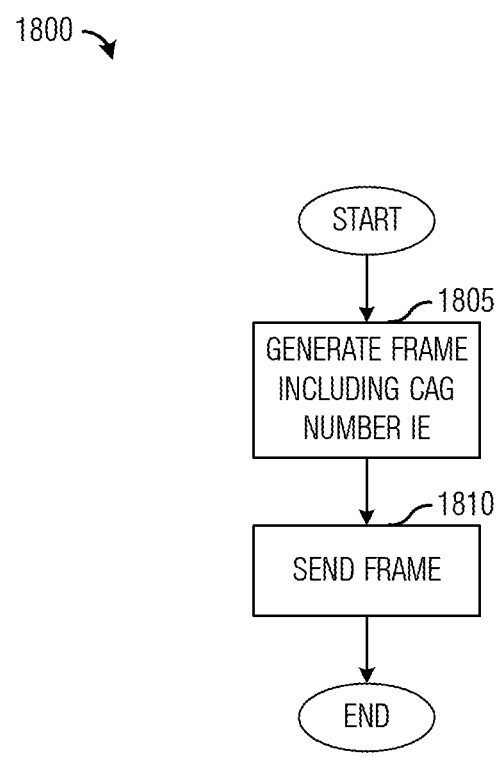
FIG. 18 illustrates a flow diagram of example operations 1800 occurring in a communications device transmitting a frame including a CAG Number IE according to example embodiments described herein.

FIG. 18 illustrates a flow diagram of example operations 1800 occurring in a communications device transmitting a frame including a CAG Number IE. Operations 1800 may be indicative of operations occurring in communications device such as a STA and/or an AP, as the communications device transmits a frame including a CAG Number IE.

Operations 1800 may begin with the communications device generating a frame including a CAG Number IE in accordance with FIG. 16 or 17 (block 1805). The frame may be a Beacon frame, a Probe Response frame, a GAS Initial Request frame, a Short Beacon frame, a Public Action frame, and the like. The CAG Number IE may include one or more CAG tuples, with each CAG tuple including a CAG version field, a scope field (which may be either 3 bits long or 8 bits long) and an advertisement protocol ID field (which may be either 5 bits long or 8 bits long). The communications device may send the frame (block 1810).

It should be noted that GAS Initial Request and GAS Initial Response frames are used merely as examples to describe the example embodiments. Other public action frames, such as the Service Discovery Request frame and Service Discovery Response frame defined in the WFA Wi-Fi Direct specification, or any new public action frames that provides similar services as a Layer 2 transport of higher layer query request data and query response data, are also possible.

The example embodiments described can be applied not only to enhance the current 802.11ai CAG feature as defined in Draft 802.11ai Amendment D2.0, which is defined for ANQP only, but also to enhance other existing advertisement protocols such as RLQP as defined in 802.11af Amendment for TV White Space technology, medium-independent handover (MIH) information service, medium-independent handover (MIH) command and event services capability discovery, emergency alert system (EAS), access network discovery and selection function (ANDSF), as well as to those yet-to-be-defined advertisement protocols such as PADP, which is being studied by 802.11aq project for pre-association discovery. Thus, the server may be a server supporting one or more of ANQP, MIH, RLQP, PADP, ANDSF, and the like. The CAG may be defined as any group of higher layer information associated with a higher layer protocol that uses the Layer 2 frames as transport means between an STA and an AP that the server connects to. For example, the higher layer information may be related to service information, protocol information, configuration information, TV White Space map or database of channel availability information. The use of these techniques may be for any kind of discovery purpose. For example, the discovery process may be a network discovery, wherein the network may be an access network, a subscription service provider network (SSPN), and/or a cellular network, a service discovery, an information discovery, or discovering an available TV White Space channel. The decision to be made after the discovery process may any kind of decision, such as a network selection decision, a service selection decision, a peer device selection decision, a decision to use an available TV White Space channel for communications, etc. The CAG version number may also be referred as a configuration change count, a configuration sequence number, a configuration set number, a TV White Space map index number, etc.

Broadly speaking, a station (or a device, a user equipment, a terminal, a mobile, and the like) may be communicating to a server through an access point (or a base station, a controller, a Nobe B, an enhance Node B, and the like) in order to obtain a higher layer information associated with the server, by using the Layer 2 transports provided between the station and the access point and between the access point and the server. An index number (or version number, change count, configuration sequence number, and so forth) may be associated with the higher layer information. The index number and the higher layer information may be provided to the station from the server, for example, during a prior visit, and may be stored by the station. The latest index number may also be provided to the access point by the server. In a subsequent visit to the access point by the station, the station may provide its stored index number to the access point. Since the higher layer information may be associated with a higher layer protocol, which is identified by a protocol identifier, the station may also provide the associated protocol identifier to the access point. The access point may compare the index number provided by the station and the index number provided by the server. The access point may use the protocol identifier provided by the station to select the server, of which the index number is compared to the index number provided by the station. If the two index numbers are the same, the access point may indicate so to the station so that the station may use its stored higher layer information for the purpose that the higher layer information is used for (such as selecting a network, discovering a service, etc.), without further receiving the higher layer information from the server. The station may provide its stored index number to the access point in a portion of a Layer 2 frame that is visible to the access point, so that the higher layer information or a higher layer query of such higher layer information may remain transparent to the access point even though the higher layer information or the higher layer query may be contained in a portion of a Layer 2 frame that is transmitted between the station and the access point.

Figure 19:
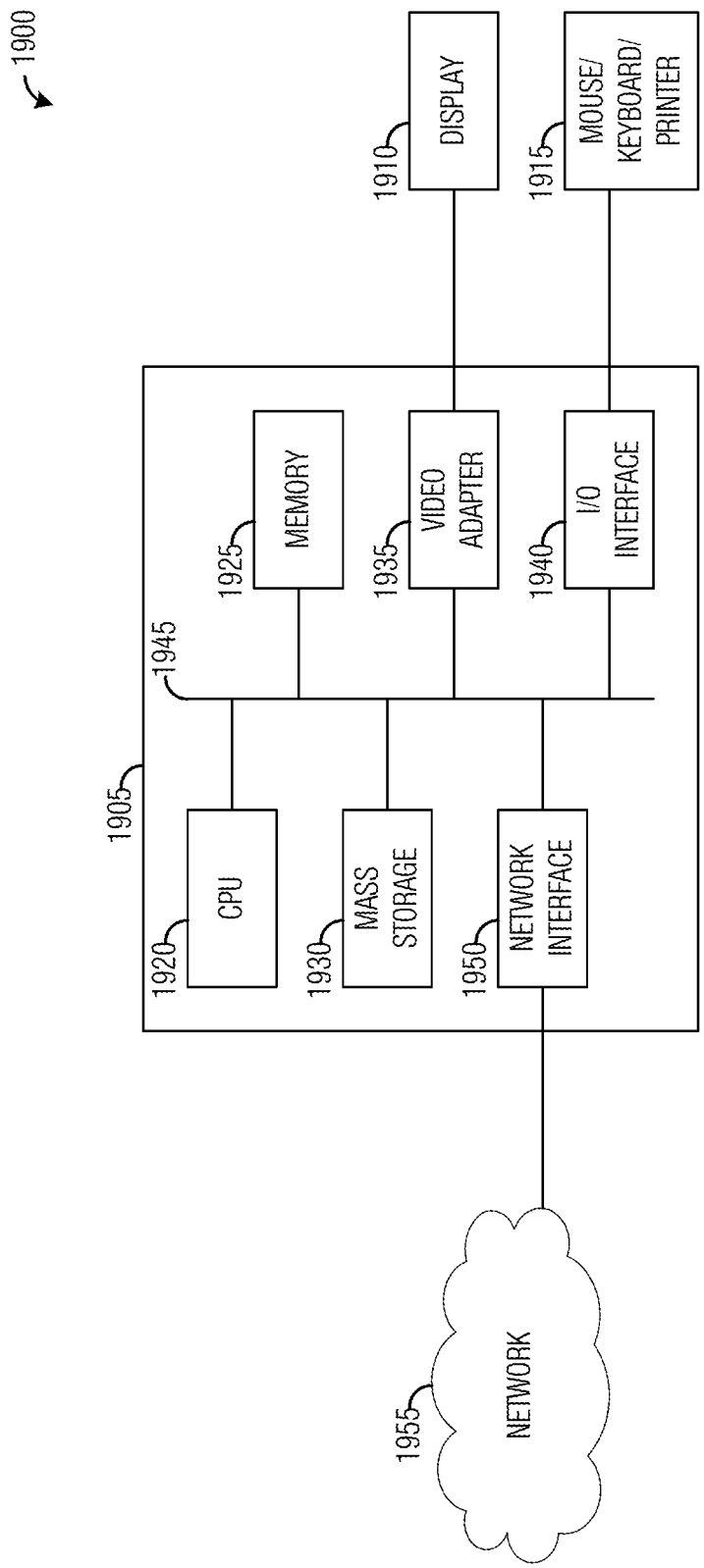
FIG. 19 illustrates a computing platform that may be used for implementing, for example, the devices and methods described herein, in accordance with an embodiment.

FIG. 19 is a block diagram of a processing system 1900 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit 1905 equipped with one or more input/output devices, such as a human interface 1915 (including speaker, microphone, mouse, touchscreen, keypad, keyboard, printer, and the like), display 1910, and so on. The processing unit may include a central processing unit (CPU) 1920, memory 1925, a mass storage device 1930, a video adapter 1935, and an I/O interface 1940 connected to a bus 1945.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces 1950, which may comprise wired links, such as an Ethernet cable or the like, and/or wireless links to access nodes or different networks 1955. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Although the present disclosure and its advantages have been described in detail, it should be understood that various changes, substitutions and alterations can be made herein without departing from the spirit and scope of the disclosure as defined by the appended claims.

What is claimed is:

1. A method for operating a station during a discovery process, the method comprising:
    transmitting, by the station, a first Layer 2 frame to an access point (AP), the first Layer 2 frame including a first version number associated with first higher layer information and an identifier of a protocol associated with both the first higher layer information and the first version number;
    receiving, by the station, a second Layer 2 frame from the AP including an indication that a second version number associated with a second higher layer information is the same as the first version number; and
    deciding, by the station, whether to perform a network selection process in accordance with the first higher layer information.

2. The method of claim 1, further comprising prior to transmitting the first Layer 2 frame:
    acquiring the first higher layer information and the first version number; and
    storing the first higher layer information and the first version number.

3. The method of claim 2, wherein the first higher layer information and the first version number are acquired from a server, wherein the first higher layer information and the second higher layer information are associated with the server, and wherein the first version number and second version numbers are the same when the first higher layer information and the second higher layer information are the same, otherwise, the first version number and the second version numbers are different.

4. The method of claim 1, wherein the first Layer 2 frame further includes a query request for the second higher layer information.

5. The method of claim 1, wherein the first Layer 2 frame is an IEEE 802.11 GAS Initial Request frame and the second Layer 2 frame is an IEEE 802.11 GAS Initial Response frame.

6. The method of claim 1, wherein the first version number is included in an advertisement protocol element in the first Layer 2 frame.

7. The method of claim 1, wherein the first version number is included in a common advertisement group (CAG) number element in the first Layer 2 frame.

8. The method of claim 1, wherein the first version number and the second version number are common advertisement group version numbers (CAG version numbers) and the first higher layer information and the second higher layer information are common advertisement groups (CAG).

9. The method of claim 1, wherein the first higher layer information comprises service features and parameters associated with a server.

10. The method of claim 1, wherein the protocol is one of access network query protocol (ANQP), registered location query protocol (RLQP), pre-association discovery protocol (PADP), medium-independent handover (MIH) information service, medium-independent handover (MIH) command and event services capability discovery, and emergency alert system (EAS).

11. A method for operating an access point, the method comprising:
    receiving, by the access point, a first Layer 2 frame from a station, the first Layer 2 frame including a first version number associated with first higher layer information and an identifier of a protocol associated with both the first higher layer information and the first version number;
    obtaining, by the access point, a second version number associated with second higher layer information from a server;
    determining, by the access point, if the first version number and the second version number match; and
    transmitting, by the access point, a second Layer 2 frame to the station when the first version number and the second version number match, the second Layer 2 frame including an indication that the first version number and the second version number match.

12. The method of claim 11, further comprising:
    transmitting a third Layer 2 frame to the station when the first version number and the second version number do not match, the third Layer 2 frame including an indication that the first version number and the second version number do not match.

13. The method of claim 12, further comprising:
    receiving a fourth Layer 2 frame from the station, the fourth Layer 2 frame including a query request;
    forwarding the query request to the server;
    receiving a query response from the server; and
    sending a fifth Layer 2 frame to the station, the fifth Layer 2 frame including the query response.

14. The method of claim 11, further comprising:
    when the first version number and the second version number do not match,
        retrieving a query request from the first Layer 2 frame,
        forwarding the query request to the server in accordance with the identifier of the protocol,
        receiving a query response from the server, and
        sending a sixth Layer 2 frame to the station, the sixth Layer 2 frame including the query response.

15. The method of claim 11, wherein the first Layer 2 frame is an IEEE 802.11 GAS Initial Request frame and the second Layer 2 frame is an IEEE 802.11 GAS Initial Response frame.

16. The method for claim 11, wherein the first version number and the second version number is a common advertisement group version number (CAG version number) and the first higher layer information and the second higher layer information is a common advertisement group (CAG).

17. The method of claim 11, wherein the indication that the first version number and the second version number match is contained in a status code field in the second Layer 2 frame.

18. A station adapted to perform a discovery process, the station comprising:
a processor; and
a computer readable storage medium storing programming for execution by the processor, the programming including instructions to:
transmit a first Layer 2 frame to an access point (AP), the first Layer 2 frame including a first version number associated with first higher layer information and an identifier of a protocol associated with both the first higher layer information and the first version number,
receive a second Layer 2 frame from the AP including an indication that a second version number associated with a second higher layer information is the same as the first version number, and
decide whether to perform a network selection process in accordance with the first higher layer information.

19. The station of claim 18, wherein the programming includes instructions to acquire the first higher layer information and the first version number, and store the first higher layer information and the first version number.

20. The station of claim 18, wherein the first version number is included in an advertisement protocol element in the first Layer 2 frame.

21. The station of claim 18, wherein the first version number is included in a common advertisement group (CAG) number element in the first Layer 2 frame.

22. The station of claim 18, wherein the first Layer 2 frame further includes a query request for the second higher layer information.

23. The station of claim 18, wherein the first Layer 2 frame is an IEEE 802.11 GAS Initial Request frame and the second Layer 2 frame is an IEEE 802.11 GAS Initial Response frame.

24. An access point adapted to participate in a discovery process, the access point comprising:
a processor; and
a computer readable storage medium storing programming for execution by the processor, the programming including instructions to:
receive a first Layer 2 frame from a station, the first Layer 2 frame including a first version number associated with first higher layer information and an identifier of a protocol associated with both the first higher layer information and the first version number,
obtain a second version number associated with second higher layer information from a server,
determine if the first version number and the second version number match, and
transmit a second Layer 2 frame to the station when the first version number and the second version number match, the second Layer 2 frame including an indication that the first version number and the second version number match.

25. The access point of claim 24, wherein the programming includes instructions to transmit a third Layer 2 frame to the station when the first version number and the second version number do not match, the third Layer 2 frame including an indication that the first version number and the second version number do not match.

26. The access point of claim 25, wherein the programming includes instructions to receive a fourth Layer 2 frame from the station, the fourth Layer 2 frame including a query request, forward the query request to the server, receive a query response from the server, and send a fifth Layer 2 frame to the station, the fifth Layer 2 frame including the query response.

27. The access point of claim 24, wherein the programming includes instructions to, when the first version number and the second version number do not match, retrieve a query request from the first Layer 2 frame, forward the query request to the server in accordance with the identifier of the protocol, receive a query response from the server, and send a sixth Layer 2 frame to the station, the sixth Layer 2 frame including the query response.

28. The access point of claim 24, wherein the indication that the first version number and the second version number match is contained in a status code field in the second Layer 2 frame.

29. A method for operating a communications device adapted to send a Layer 2 frame, the method comprising:
generating, by the communications device, the Layer 2 frame comprising at least one Common Advertisement Group (CAG) tuple field, wherein the at least one CAG tuple field comprises a CAG version number field containing a CAG version number and an identifier of advertisement protocol field; and
sending, by the communications device, the Layer 2 frame.

30. The method of claim 29, wherein the CAG version number field is 8 bits in size.

31. The method of claim 29, wherein the identifier of advertisement protocol field contains an advertisement protocol identifier of an advertisement protocol associated with the CAG version number within a same CAG tuple field.

32. The method of claim 31, wherein the advertisement protocol is access network query protocol (ANQP) and the identifier of advertisement protocol field contains a value of zero.

33. The method of claim 31, wherein the advertisement protocol is registered location query protocol (RLQP) and the identifier of advertisement protocol field contains a value of 4.

34. The method of claim 29, wherein the Layer 2 frame is one of a beacon frame, a probe response frame, a short beacon frame, and a public action frame, wherein the communication device is an access point (AP).

35. The method of claim 29, wherein the Layer 2 frame is a generic advertisement service (GAS) initial request frame and the communication device is a station.

36. The method of claim 29, wherein the Layer 2 frame further comprising a scope field containing a scope value.

37. A station comprising:
a processor; and
a computer readable storage medium storing programming for execution by the processor, the programming including instructions to:

generate a Layer 2 frame comprising at least one Common Advertisement Group (CAG) tuple field, wherein the at least one CAG tuple field comprises a CAG version number field containing a CAG version number, and an identifier of advertisement protocol field, and send the Layer 2 frame.

38. The station of claim 37, wherein the CAG version number field is 8 bits in size.

39. The station of claim 37, wherein the identifier of advertisement protocol field contains an advertisement protocol identifier of an advertisement protocol associated with the CAG version number within a same CAG tuple field.

40. The station of claim 39, wherein the advertisement protocol is access network query protocol (ANQP) and the identifier of advertisement protocol field contains a value of zero.

41. The station of claim 39, wherein the advertisement protocol is registered location query protocol (RLQP) and the identifier of advertisement protocol field contains a value of 4.

* * * * *